(12) United States Patent
Wilcox

(10) Patent No.: US 9,221,565 B2
(45) Date of Patent: Dec. 29, 2015

(54) SYSTEMS AND METHODS FOR SEALING CONTAINERS HAVING A NON-PLANAR FLANGE

(71) Applicant: Intercontinental Great Brands LLC, East Hanover, NJ (US)

(72) Inventor: Stephen P. Wilcox, Glenview, IL (US)

(73) Assignee: Intercontinental Great Brands LLC, East Hanover, NJ (US)

( * ) Notice: Subject to any disclaimer, the term of this patent is extended or adjusted under 35 U.S.C. 154(b) by 0 days.

(21) Appl. No.: 14/383,563

(22) PCT Filed: Mar. 7, 2013

(86) PCT No.: PCT/US2013/029578
§ 371 (c)(1),
(2) Date: Sep. 7, 2014

(87) PCT Pub. No.: WO2013/134495
PCT Pub. Date: Sep. 12, 2013

(65) Prior Publication Data
US 2015/0096270 A1    Apr. 9, 2015

Related U.S. Application Data

(60) Provisional application No. 61/608,080, filed on Mar. 7, 2012.

(51) Int. Cl.
*B65B 7/28* (2006.01)
*B65B 51/16* (2006.01)
(Continued)

(52) U.S. Cl.
CPC .............. *B65B 7/2878* (2013.01); *B29C 65/787* (2013.01); *B29C 65/7867* (2013.01);
(Continued)

(58) Field of Classification Search
CPC ........ B65B 7/162; B65B 7/165; B65B 7/168; B65B 7/28; B65B 7/2842; B65B 7/285; B65B 7/2871; B65B 7/2878; B65B 51/16; B65B 43/60; B65B 23/10–23/18; B29C 65/7867; B29C 65/787; B29C 66/81422; B29C 66/81411; B29C 66/81423; B29C 66/81451
USPC ........... 53/485, 300, 478, 487, 488, 287, 290, 53/296, 297, 313, 314, 315, 316, 53/329.2–329.4, 367; 156/69, 582
See application file for complete search history.

(56) References Cited

U.S. PATENT DOCUMENTS 2,970,414 A * 2/1961 Rohdin .......................... 53/453
2,975,574 A * 3/1961 Jorgenson et al. ............... 53/287
(Continued)

FOREIGN PATENT DOCUMENTS

DE    102004062520 A1 *  7/2006
WO        03057564 A1     7/2003
(Continued)

OTHER PUBLICATIONS

International Search Report, date of mailing Jul. 19, 2013 for PCT/US2013/029578 (5 pgs.).
(Continued)

*Primary Examiner* — Stephen F Gerrity
(74) *Attorney, Agent, or Firm* — Fitch, Even, Tabin & Flannery LLP

(57) ABSTRACT

A method of sealing a package containing a food product is provided. The method comprises applying a lid to a non-planar flange surrounding a periphery of the food package. The method comprises supporting at least a portion of the non-planar flange and progressively sealing the lid to the supported portion of the non-planar flange by applying pressure at one or more tangent points against the lid and the flange using a sealing member having a pressure applying surface that rotates about an axis of rotation and one of radially varies relative to the axis of rotation and the axis of rotation reciprocates.

22 Claims, 15 Drawing Sheets

(51) Int. Cl.

| | |
|---|---|
| *B65B 23/10* | (2006.01) |
| *B29C 65/00* | (2006.01) |
| *B65D 77/20* | (2006.01) |
| *B65D 85/36* | (2006.01) |
| *B65B 7/16* | (2006.01) |
| *B65B 43/60* | (2006.01) |
| *B65B 51/14* | (2006.01) |
| *B29L 31/00* | (2006.01) |
| *B29C 65/78* | (2006.01) |
| *B29C 65/48* | (2006.01) |

(52) U.S. Cl.
CPC ............. *B29C66/112* (2013.01); *B29C 66/131* (2013.01); *B29C 66/301* (2013.01); *B29C 66/345* (2013.01); *B29C 66/3452* (2013.01); *B29C 66/53461* (2013.01); *B29C 66/542* (2013.01); *B29C 66/81422* (2013.01); *B29C 66/81423* (2013.01); *B29C 66/81431* (2013.01); *B29C 66/81451* (2013.01); *B29C 66/81457* (2013.01); *B29C 66/83411* (2013.01); *B29C 66/83413* (2013.01); *B29C 66/83511* (2013.01); *B29C 66/83513* (2013.01); *B29C 66/849* (2013.01); *B65B 7/165* (2013.01); *B65B 7/2842* (2013.01); *B65B 7/2871* (2013.01); *B65B 23/10* (2013.01); *B65B 43/60* (2013.01); *B65B 51/14* (2013.01); *B65B 51/16* (2013.01); *B65D 77/2024* (2013.01); *B65D 85/36* (2013.01); *B29C 65/48* (2013.01); *B29C 65/7847* (2013.01); *B29C 66/71* (2013.01); *B29C 66/723* (2013.01); *B29C 66/72321* (2013.01); *B29C 2793/0081* (2013.01); *B29L 2031/7162* (2013.01); *B65D 2577/205* (2013.01)

(56) References Cited

U.S. PATENT DOCUMENTS

| | | | | |
|---|---|---|---|---|
| 3,338,723 | A | | 8/1967 | Lundquist |
| 3,411,767 | A | * | 11/1968 | Moser et al. ............... 270/52.07 |
| 3,587,829 | A | * | 6/1971 | Sorensen ................. 198/867.12 |
| 3,908,342 | A | * | 9/1975 | Raque ............... B29C 66/87443 198/803.13 |
| 4,121,404 | A | | 10/1978 | Davis |
| 5,366,685 | A | * | 11/1994 | Fujii et al. ............... B29C 51/30 264/547 |
| 5,806,277 | A | * | 9/1998 | Scheifele et al. ............ 53/374.4 |
| 6,109,000 | A | * | 8/2000 | Conti ................................ 53/51 |
| 7,121,065 | B2 | * | 10/2006 | Christ .................... B29C 65/18 53/329.4 |
| 7,448,183 | B2 | * | 11/2008 | Gertitschke et al. ......... 53/329.4 |
| 2002/0152726 | A1 | | 10/2002 | Oguri |
| 2008/0314501 | A1 | * | 12/2008 | Sullivan et al. ... B29C 66/81422 156/64 |
| 2010/0107558 | A1 | * | 5/2010 | Krahl et al. ................... 53/329.4 |
| 2010/0115893 | A1 | * | 5/2010 | Sparakowski et al. .......... 53/485 |
| 2012/0012491 | A1 | * | 1/2012 | Wade ............................ 206/461 |

FOREIGN PATENT DOCUMENTS

| | | | |
|---|---|---|---|
| WO | 2005058705 A1 | | 6/2005 |
| WO | WO 2011119139 A1 | * | 9/2011 |

OTHER PUBLICATIONS

International Preliminary Report on Patentability, date of issuance Sep. 9, 2014 and Written Opinion of the International Searching Authority for PCT/US2013/029578 (8 pgs.).

\* cited by examiner

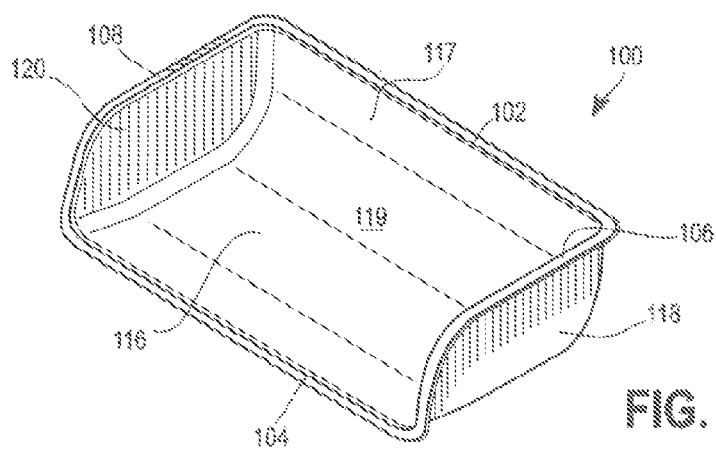
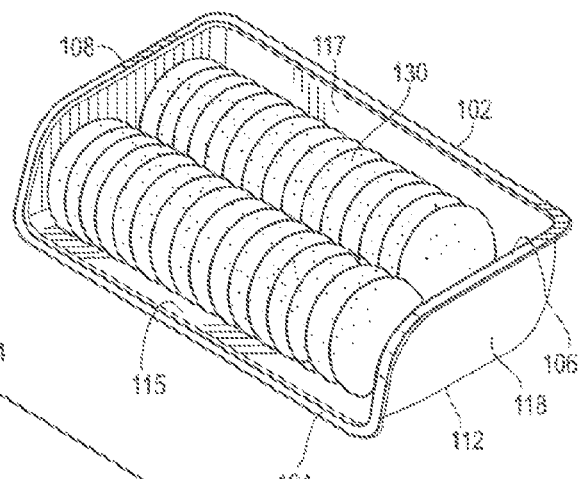
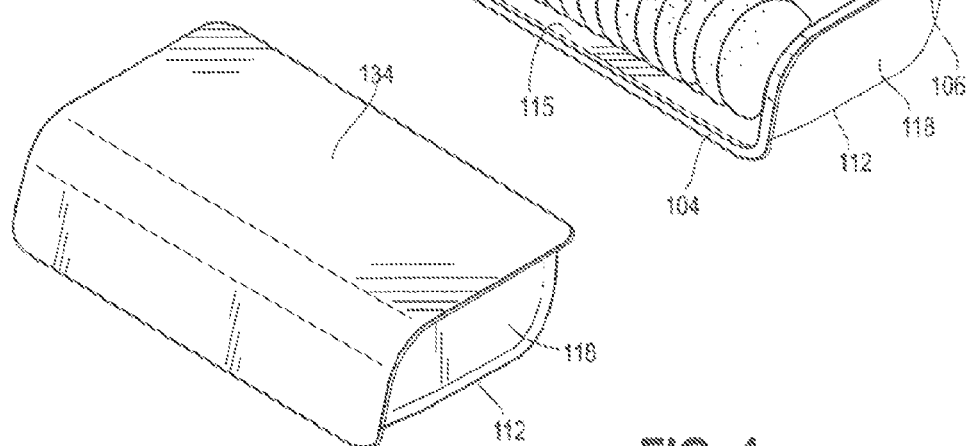
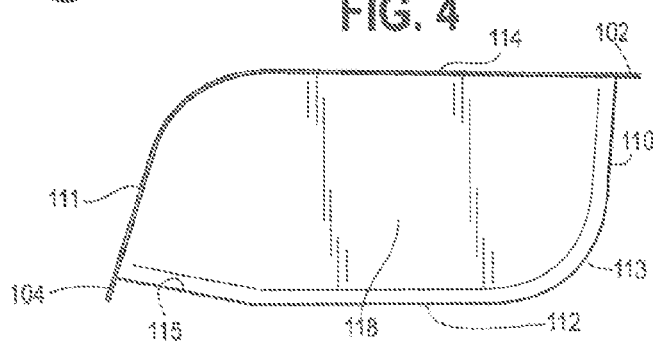

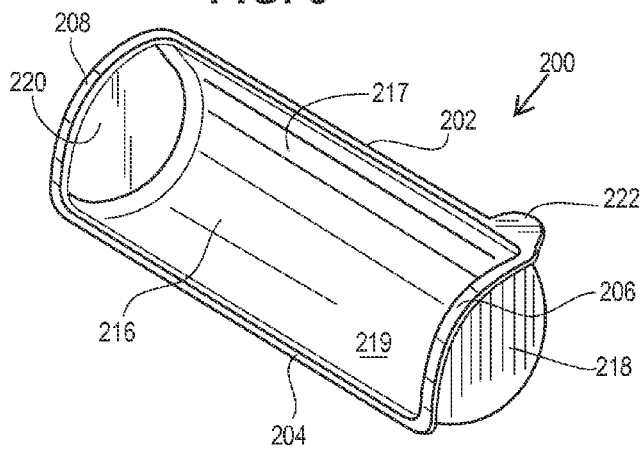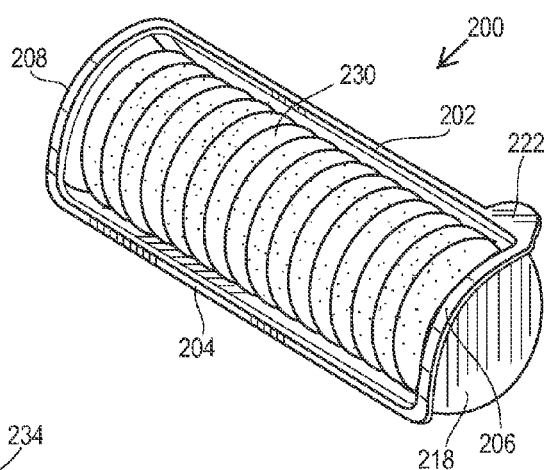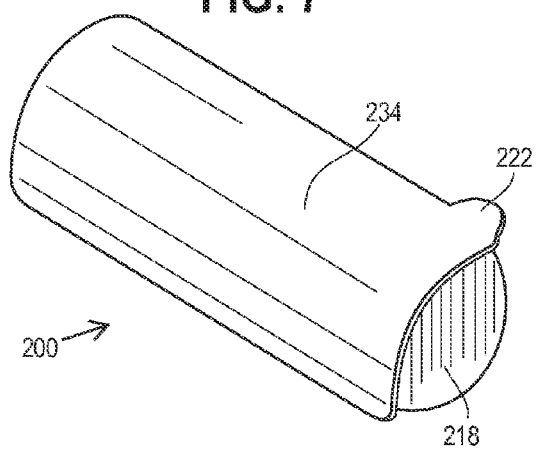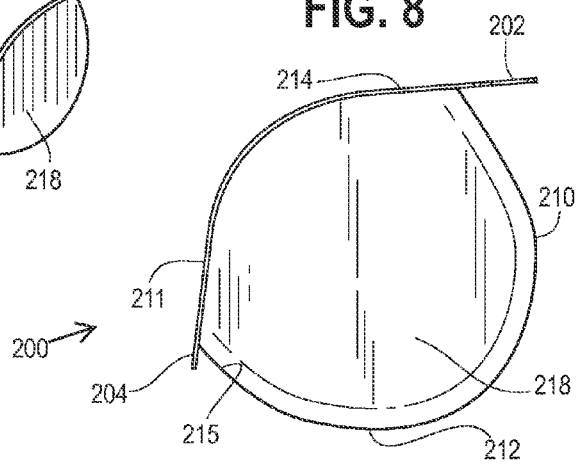

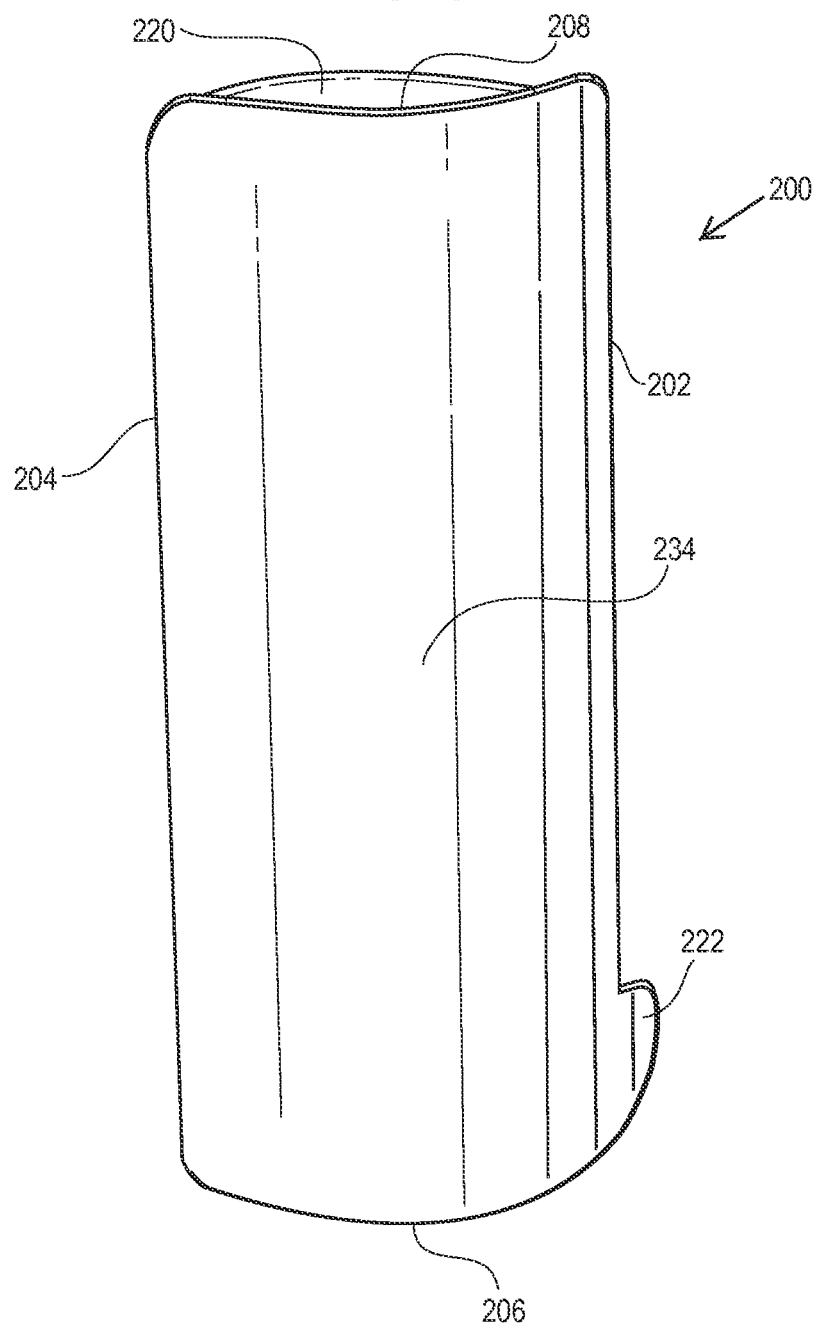

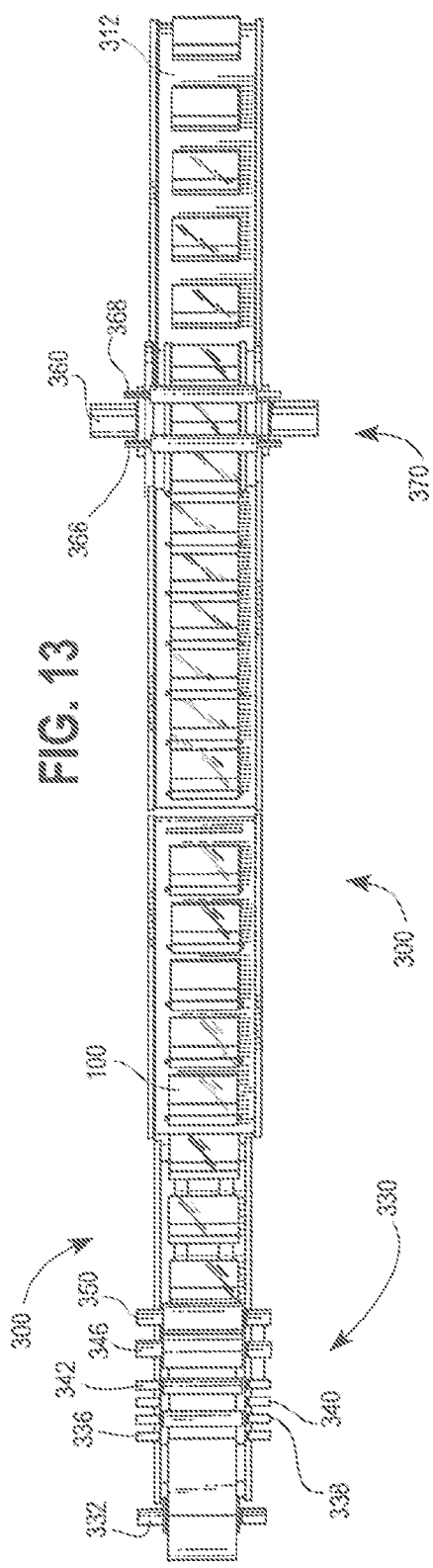
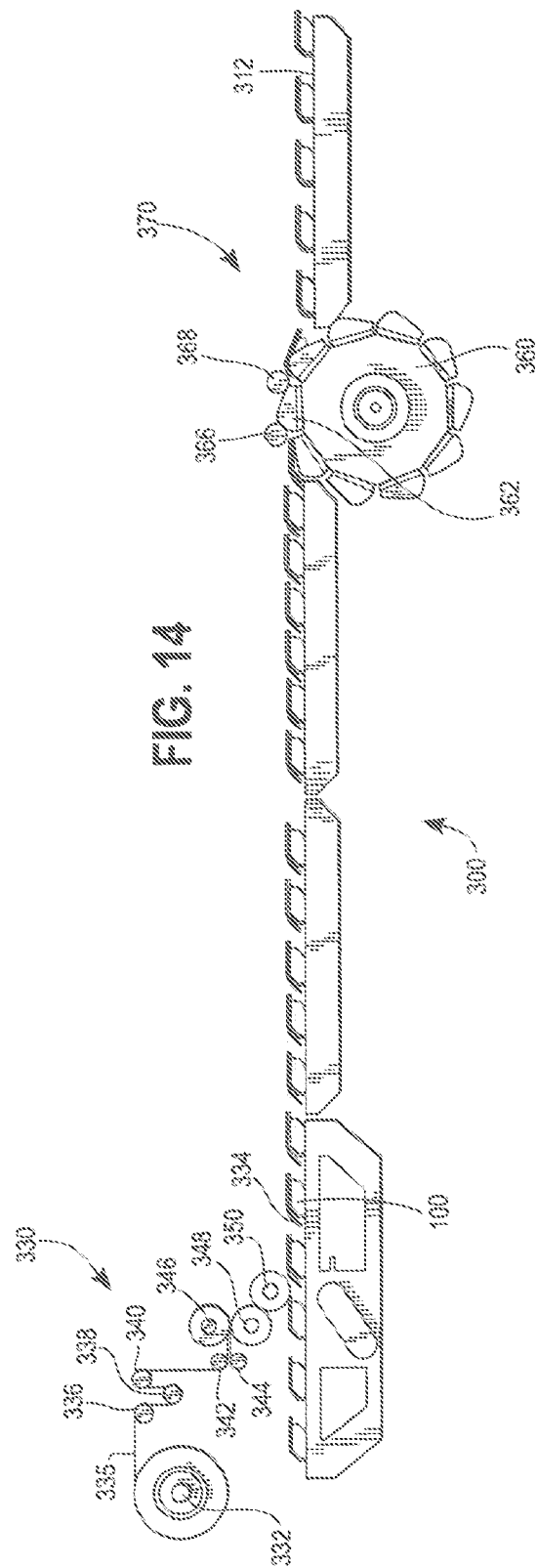

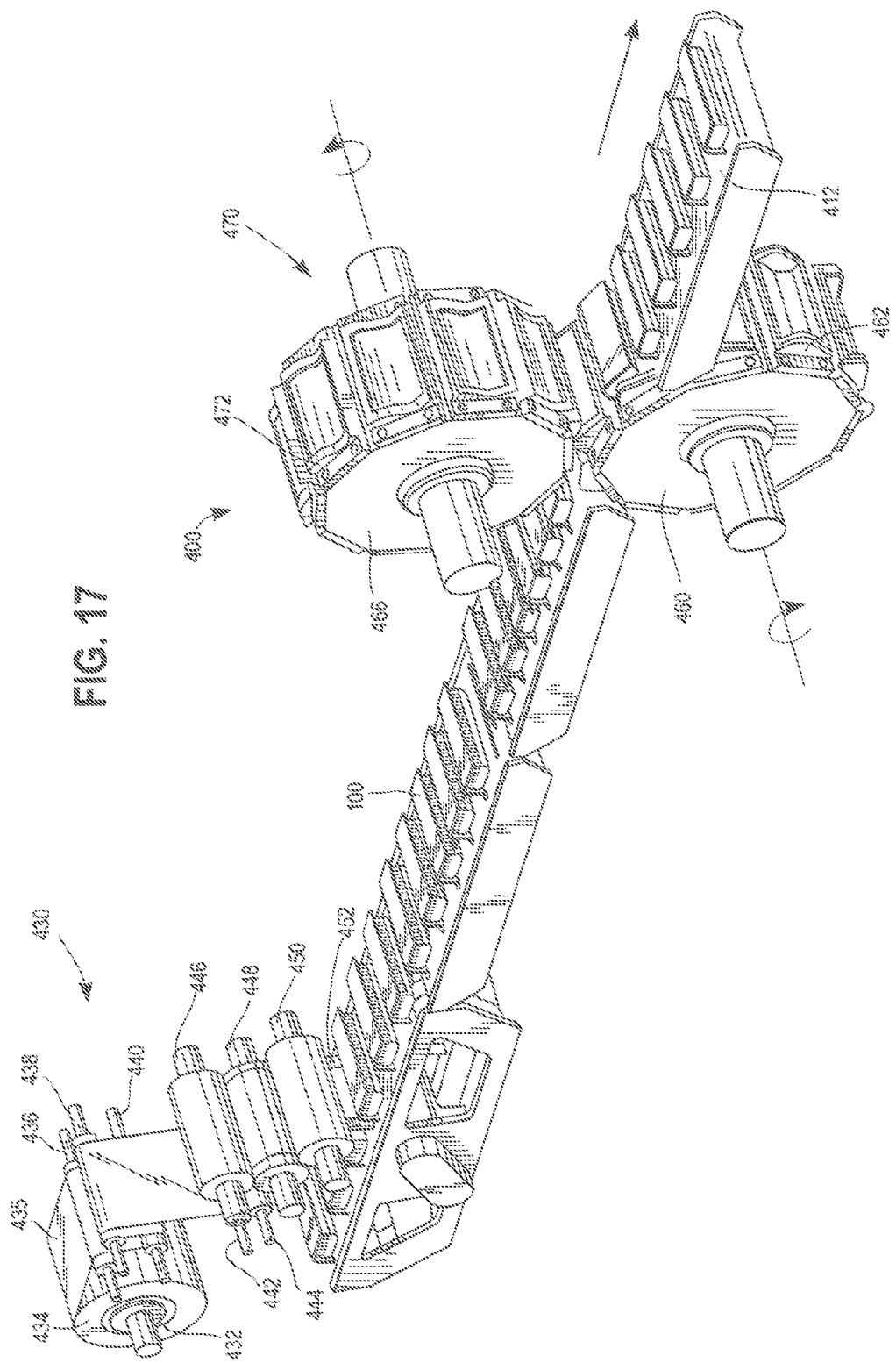

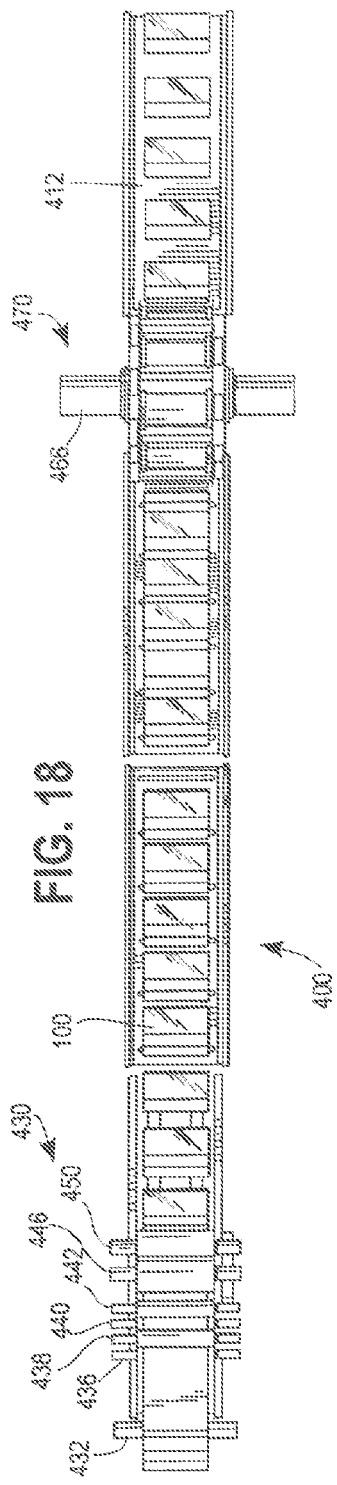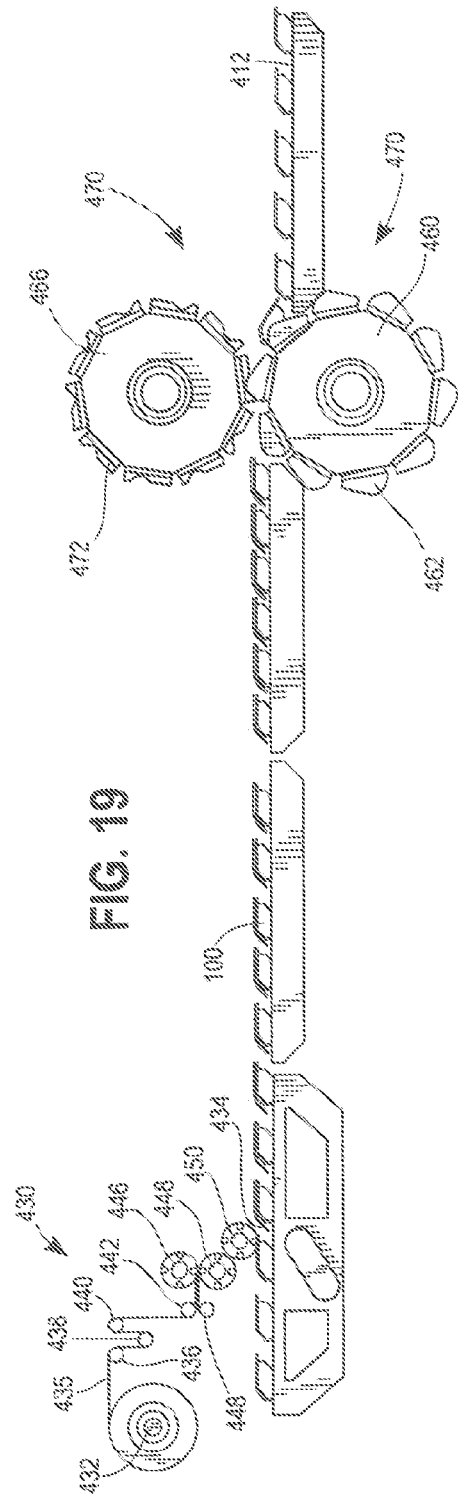

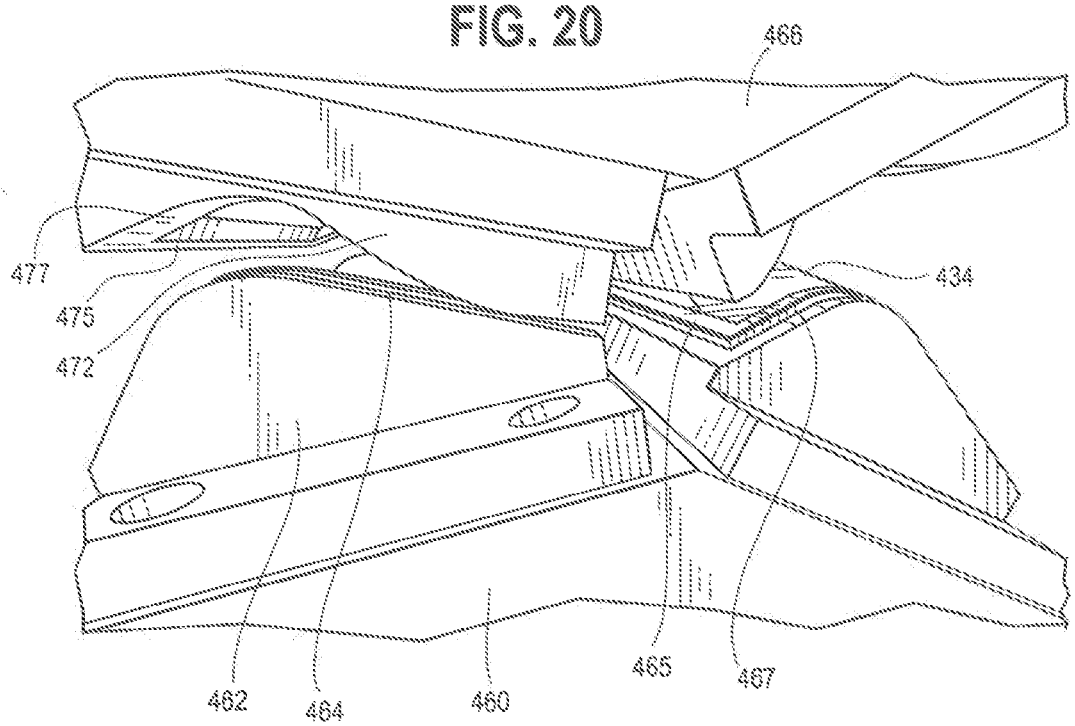
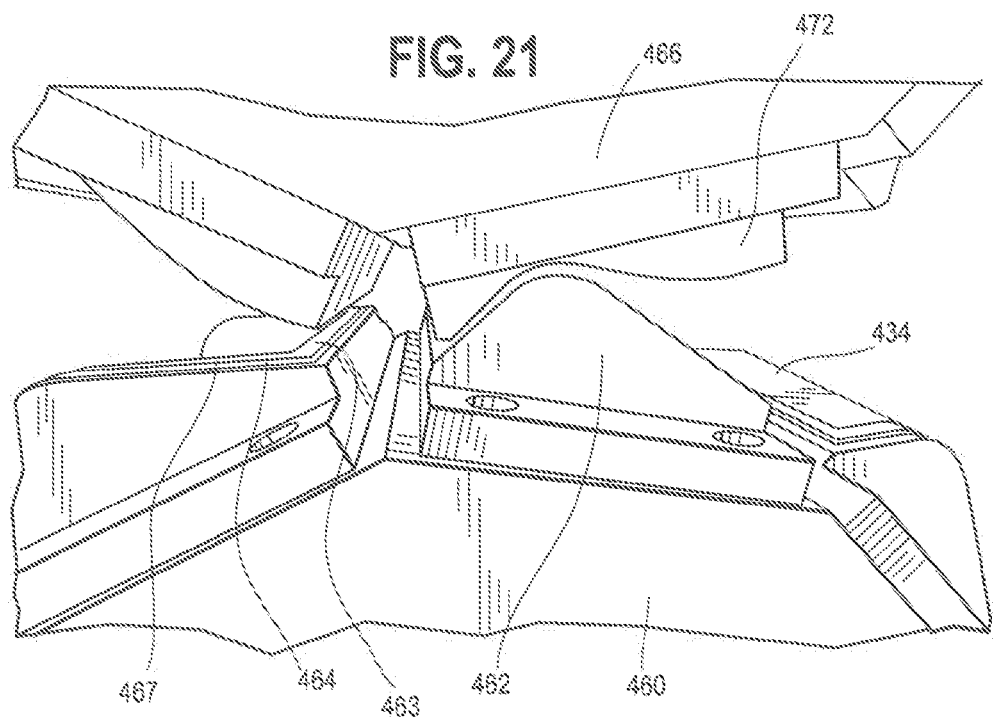

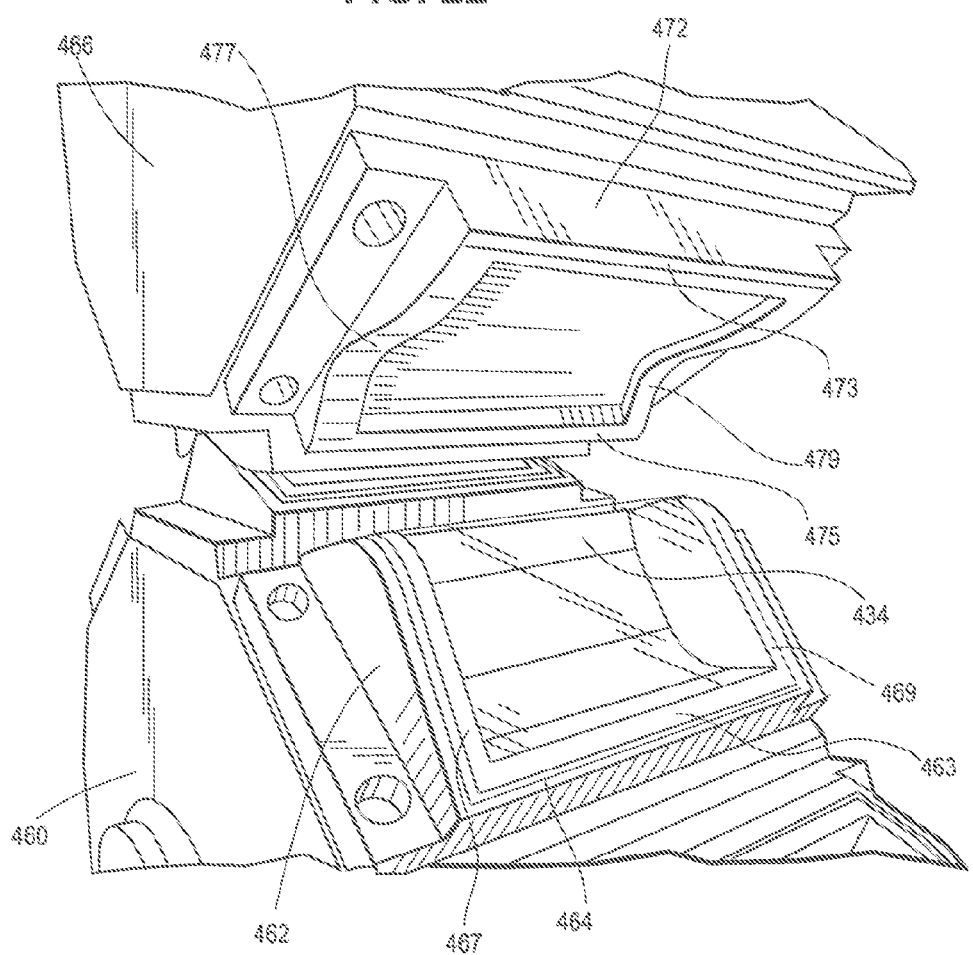

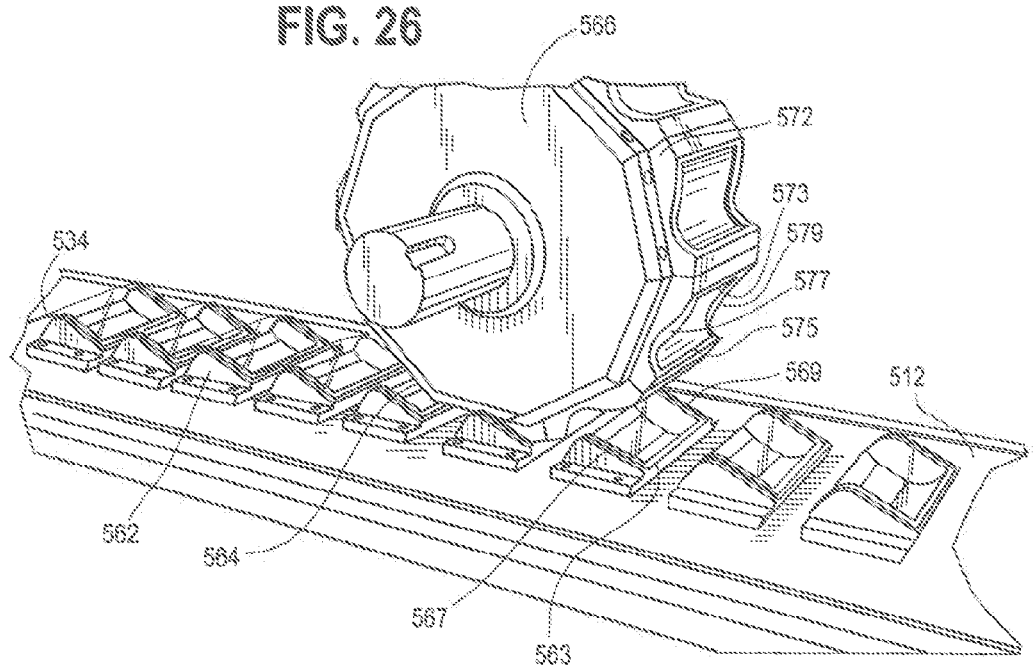
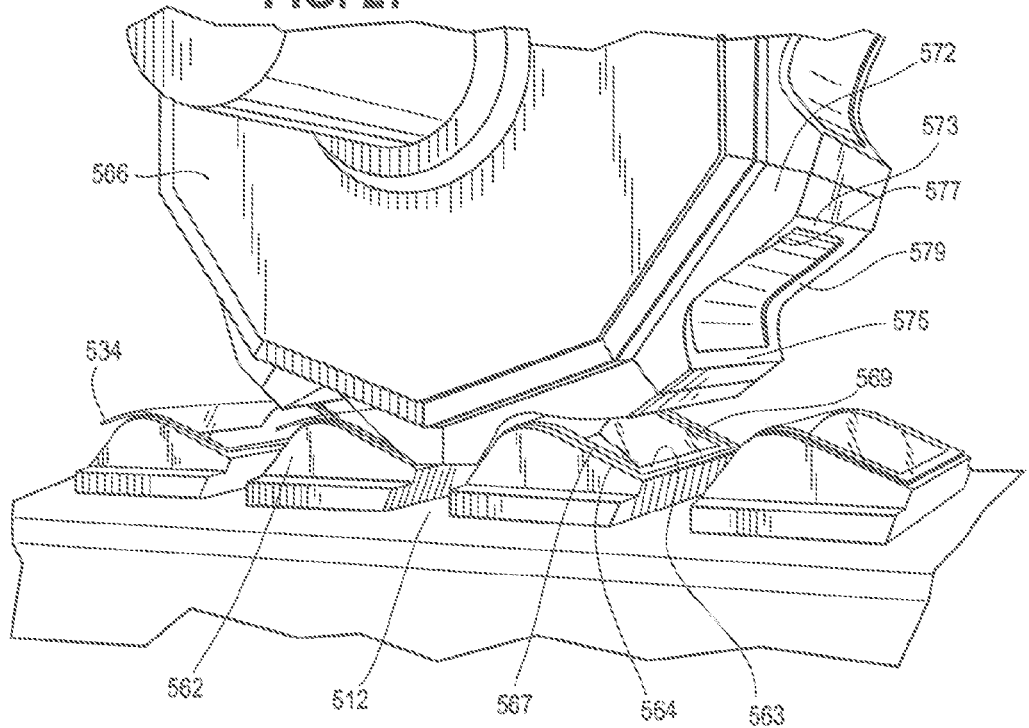

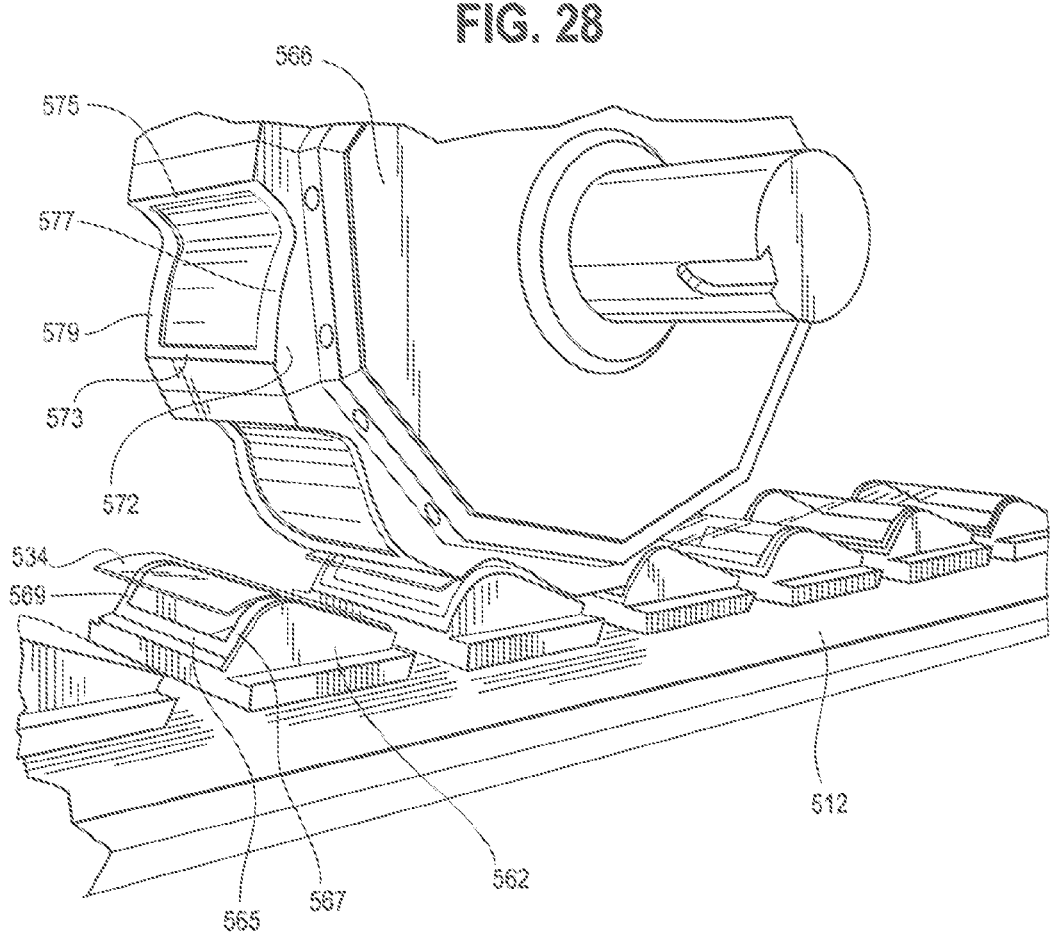

SYSTEMS AND METHODS FOR SEALING CONTAINERS HAVING A NON-PLANAR FLANGE

CROSS-REFERENCE TO RELATED APPLICATION APPLICATIONS

This application is a U.S. national phase application filed under 35 U.S.C. §371 of International Application PCT/US2013/029578, filed Mar. 7, 2013, designating the United States, which claims the benefit of U.S. Patent Appl. No. 61/608,080, filed Mar. 7, 2012, which are hereby incorporated by reference in their entirety.

FIELD

Systems and methods for sealing food product containers are described herein, and in particular, systems and methods for sealing food product containers having non-planar flanges.

BACKGROUND

Food product trays typically have planar or flat, symmetric seal flanges. Traditional sealing methods utilise a sealing surface that is applied in one plane that is immediately above the planar surface of the seal flanges. In addition, such methods typically utilize an equal length of lid film stock for a given length of the seal flange of the container such that the seal flange length is equal to its projected dimension on the original, unformed sheet.

The above described methods would not be effective to seal packages having flanges that do not lie in one plane, such as curved or non-planar flanges. For example, in a package with one or more curved flanges, the traditional methods of measuring and applying the lid film would not be feasible because the projected dimension of the seal flange would be less than the length along the curve of the sealing flange and a greater length of lid material would be needed for a corresponding length of the base package. In a package where a portion of the flange curves or otherwise deviates out of the flat plane, traditional methods would result in the curved flange remaining unsealed because the sealing surface would only applied in one plane and would not contact the curved portion of the seal flange.

A method of sealing a package containing a food product is provided. The method comprises applying a lid to a non-planar flange surrounding a periphery of the food package. The method comprises supporting at least a portion of the non-planar flange and progressively sealing the lid to the supported portion of the non-planar flange by applying pressure at one or more tangent points against the lid and the flange using a sealing member having a pressure applying surface that rotates about an axis of rotation and one of radially varies relative to the axis of rotation and the axis of rotation reciprocates.

The step of supporting at least a portion of the non-planar flange can further include supporting the flange along its entire surface during the step of progressively sealing the lid.

The step of supporting at least a portion of the non-linear flange can further include supporting the flange using a flange support surface that rotates about an axis of rotation. The axis of rotation of the flange support surface can be parallel to the axis of rotation of the pressure applying surface.

The non-planar flange can advance in a linear direction perpendicular to the axis of rotation of the pressure applying surface.

The non-planar flange can have a projected length in a machine direction of less than a length along she flange in the machine direction.

The method can further a step of tacking a portion of the lid to a leading end of the non-planar flange.

The method can include sealing a portion of the lid to a leading end of the flange in a first plane and sealing another portion of the lid to a trailing end of the flange in a second plane.

The method of can further include a step of transporting the package along a conveyor surface with a portion of the lid attached to the non-planar flange and a portion of the lid unattached to the non-planar flange.

The method can further include providing a plurality of at least one seat including a cavity configured to receive the package with the flange being at least in part outside of the cavity.

The method can further include a step of providing at least one cylindrical top sealing member having at least one sealing surface configured to rotate and contact the non-planar flange to seal the lid to the package.

The method can also include providing two cylindrical top sealing members where one of the sealing members seals one portion of the lid to one portion of the non-planar flange and the other of the sealing members seals another portion of the lid to another portion of the non-planar flange. The method can further include rotating the two cylindrical sealing members at different speeds.

The method can also include a step of providing a bottom rotary die having a plurality of seats, each seat having a plurality of support surfaces configured to support the non-planar flange, and a top rotary sealing member having a plurality of sealing surfaces configured to rotate and contact the support surfaces of the seats to seal the lid to the package.

The method can also include a step of providing a conveyor surface including a plurality of seats, each seat having a plurality of support surfaces configured to support the non-planar flange, and a top rotary sealing member having a plurality of sealing surfaces configured to rotate over and contact each of the support surfaces to seal the lid to the package.

The method can further include applying the lid onto the flange using a pick and place device including a vacuum.

The method can further include a step of providing the sealing member having the sealing surface that is entirely non-planar.

The method can further include a step of applying the lid onto the flange from a supply film roll using a plurality of rollers, at least one of the rollers including a cutting surface.

The method can further include placing and sealing the lid onto the non-planar flange at one station.

The method can further include creating a pressure atmosphere in the package that urges the lid in a direction away from the food product stored in the package.

The method can also include creating a protective atmosphere in the food package to increase a shell life of the food product stored in the package.

The lid can be made of a flexible film or can be made of a rigid material, such as a suitably rigid blow-molded, injection molded or thermoformed plastic.

The method can further comprise providing a food storage package having a non-planar flange. The package can have a top surface that is entirely non-planar. The package can alternatively have a bottom surface that is in part planar and in part non-planar. The package can include a tray having a non-planar flange.

The method can include a step of using the sealing member having a sealing surface that radially varies relative to the axis of rotation.

The method can include a step of using the sealing member having an axis of rotation that reciprocates.

A package including a non-planar flange made according to any one of aforementioned methods is also provided. The package can include a tray having a non-planar flange.

An apparatus for sealing a lid to a non-planar flange surrounding a periphery of a package containing a food product is provided. The apparatus includes a conveyor surface configured to advance the package. The apparatus further includes a bottom rotary die protruding at least in part above the conveyor surface and having a plurality of seats, each seat having a plurality of support surfaces configured to support at least a portion of the non-planar flange. The apparatus also includes at least one top sealing member having at least one sealing surface configured to rotate and contact the non-planar flange to seal the lid to the flange.

The at least one top sealing member can rotate about a reciprocating axis of rotation to seal the lid to an entire surface of the flange.

The at least one top sealing member can comprise two top sealing members each configured to rotate about a reciprocating axis of rotation to seal the lid to the flange.

The at least one top sealing member can include a first top sealing member configured to seal one portion of the lid to one portion of the flange and a second top sealing member configured to seal another portion of the lid to another portion of the flange.

The top sealing member can comprise a plurality of sealing surfaces and is configured to rotate about one axis of rotation and contact each of the support surfaces of the seats to seal the lid to the package.

Another apparatus for sealing a lid to a non-planar flange surrounding a periphery of a package containing a food product is also provided. The apparatus comprises a conveyor configured to advance the package. The conveyor includes a plurality of seats formed thereon having a plurality of support surfaces configured to support the non-planar flange. The apparatus further includes at least one top sealing member having at least one sealing surface configured to rotate and press the lid against the flange.

The top sealing member can comprise a plurality of sealing surfaces and is configured to rotate about one axis of rotation and contact each of the support surfaces of the seats to seal the lid to the package.

The at least one sealing surface can be non-planar. The at least one sealing surface can be made of a resilient material.

The apparatus can further comprise a device configured to transfer the lid from a supply source and apply the lid onto the flange of the package. The device can comprise a vacuum source configured to lift and move the package.

BRIEF DESCRIPTION OF DRAWINGS

FIG. 1 is a perspective view of a first exemplary container having one or more non-planar flanges shown without a lid;

FIG. 2 is a perspective view of the container of FIG. 2 shown with a food product in the hollow interior of the container;

FIG. 3 is the container of FIG. 1 shown sealed with a lid;

FIG. 4 is a side elevational view of the container of FIG. 1;

FIG. 5 is a perspective view of a second exemplary container having one or more non-planar flanges shown without a lid;

FIG. 6 is a perspective view of the container of FIG. 5 shown with a food product in the hollow interior of the container;

FIG. 7 is the container of FIG. 5 shown sealed with a lid;

FIG. 8 is a side elevational view of the container of FIG. 5;

FIG. 9 is a front elevational view of the sealed container of FIG. 7, shown being positioned in a vertical orientation;

FIG. 13 is a top plan view of the conveyor system of FIG. 10;

FIG. 14 is a side elevational view of the conveyor system of FIG. 10;

FIG. 17 is a perspective view of a second exemplary conveyor system for sealing the container of FIG. 1;

FIG. 18 is a top plan view of the conveyor system of FIG. 17;

FIG. 19 is a side elevational view of the conveyor system Of FIG. 17;

FIG. 20 is a side perspective enlarged fragmentary view of the conveyor system of FIG. 17, showing the mating of the top and bottom rotary sealing members of the sealing station to seal the lid to the leading seal flange of the container of FIG. 1;

FIG. 21 is a side perspective enlarged fragmentary view of the conveyor system of FIG. 17, showing the mating of the top sealing member and the bottom rotary die of the sealing station to seal the lid to the trailing seal flange of the container of FIG. 1;

FIG. 22 is a front perspective enlarged fragmentary view of the conveyor system of FIG. 17, showing the top sealing member and the bottom rotary die of the sealing station separated and the lid fully sealed to the seal flanges of the container of FIG. 1;

FIG. 26 is a perspective fragmentary view of the conveyor system of FIG. 23, showing the mating of the top sealing member and the die train of the conveyor;

FIG. 27 is a front perspective enlarged fragmentary view of the conveyor system of FIG. 23, showing the mating of the top rotary sealing member and the seat of the die train to seal the lid to the leading seal flange of the container of FIG. 1; and FIG. 28 is a rear perspective enlarged fragmentary view of the conveyor system of FIG. 23, showing the mating of the top rotary sealing member and the seat of the die train to seal she lid to the trailing seal flange of the container of FIG. 1.

DETAILED DESCRIPTION

Figure 10:
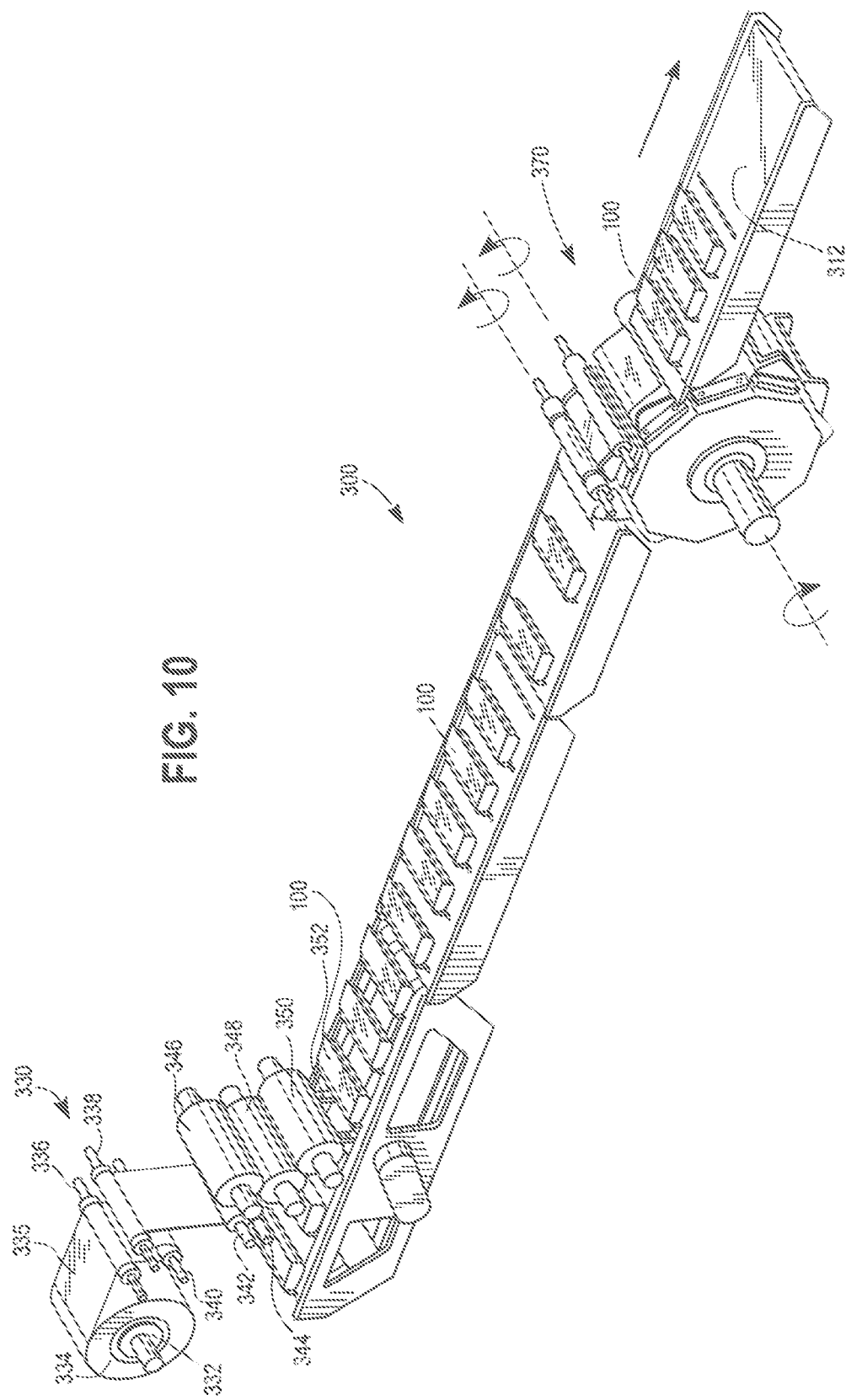
FIG. 10 is a perspective view of a first exemplary conveyor system for sealing the container of FIG. 1.

A system and method for sealing of packages having one or more curved, non-planar sealing flanges are provided. The method includes advancing the package having a non-planar seal flange on a conveyor belt in a machine direction. An optional tacking station is located upstream of the sealing station on the conveyor. The tacking station can include a lid material supply roller and plurality of rollers and/or dies which transfer the lid material from the supply roller, out the lid material, tack the lid material to the leading seal flange of the package, and align the lid material over the other seal flanges. The package, with the lid material being tacked to the leading seal flange, can be advanced along the conveyor to a sealing station.

The method also includes creating a single point of contact, or nip point, and allowing the lid material to coincide with and follow the non-planar length of the package instead of the projected length of the seal flange to seal the lid material to the seal flanges. This can be accomplished by utilizing one or more rotary sealing members. The method further can include moving a rotary top sealing member and the package in coordination so as to keep a sealing force constantly perpendicular to the tangent of contact. The system and method will be discussed in greater detail herein following a description of exemplary packages.

With reference to FIGS. 1-4, an exemplary container 100 having non-planar seal flanges is provided. The term non-planar flange will be understood to mean a flange having a first surface in one plane and a second surface in a different plane. The non-planar flange could be entirely curved, could be curved in part and straight in part, or could have two or more straight portions that are angled relative to one another.

The container 100 can be used to store a food product 130 as shown in FIG. 2. The food product 130 can be crackers, cookies, wafers, chocolates, candy, or the like. The food product 130 can be stored in one or more stacks or rows as shown in FIG. 2, or may be dump-filled into the container 100. The container 100 can be made of a flexible material including, but not limited to polyethylene, polypropylene, or the like. For example, the container 100 can be thermoformed, injection-molded, blow-molded, or the like. The container 100 can also be laminated and optionally include a metalized layer. A lid 134 may be sealed to the container 100 as shown in FIG. 3 to provide the container 100 with a hermetic seal. The lid 134 can be flexible or rigid.

With reference to FIGS. 1 and 4, the exemplary container 100 can have a bottom wall 116, a front wall 117, two opposed side walls 118 and 120, and a hollow interior 119 therebetween. The container has a leading end 110 (in the machine downstream direction), a trailing end 111 opposite the leading end 110, a bottom surface 112, and a top surface 114 opposite the bottom surface 112. The container 100 does not have a rear wall opposite the front wall 117. Instead, the container 100 has an open area at the trailing end 111. This open area can be used to unload the food product 130 stored in the hollow interior 119 of the container 100 onto a serving surface such as a tray or a plate. Optionally, a rear wall opposite the front wall 117 could be provided.

The container 100 includes a leading seal flange 102, a trailing seal flange 104, and side seal flanges 106 and 108. The leading flange 102 and adjacent portions of the side flanges 106 and 108 are flat and lie in the same horizontal plane, together defining the top surface 114 of the container 100. Portions of the side seal flanges 106 and 108 can curve or deviate in a straight line or otherwise downward from the top surface 114 toward the trailing seal flange 104. As such, the leading flange 102 and the trailing flange 104 lie in different planes as shown in FIG. 1. Indeed, the different planes including the leading and trailing seal flanges 102 and 104 are angled relative to each other as can be seen in FIG. 4. Similarly, the trailing flange 104 and portions of the side flanges 106 and 108 also lie in different planes. The non-planar shape of the sealing flanges of the container 100 provides the container 100 with a distinctive and aesthetically pleasing appearance.

With reference to FIG. 4, a portion of the leading end 110 of the container 100 can be straight and perpendicular to the top surface 114. The leading seal flange 102 protrudes beyond and overhangs the leasing end 110. A curved transition 113 is formed between the leading end 110 and the bottom surface 112 of the container 100. The portion of the bottom surface 112 proximate the curved transition 113 can be planar or flat and can be parallel to the top surface 114. The flat portion of the bottom surface 112 of the container 100 allows the container 100 to be stable when positioned on a flat surface such as a shelf or a table.

Proximate the trailing end 111 of the container 100, the bottom surface 112 of the container 100 can curve or linearly deviate upward to form a raised portion 115. This non-planar shape of the bottom surface 112 does not undermine the stability of the container 100 when positioned on a flat surface such as a shelf because a majority of the bottom surface 112 is flat. The raised portion 115 can act as stop for the circular food product 130 stored in the hollow interior 119 of the container 100, and can prevent she food product 130 from inadvertently rolling out of the container 100.

With continuing reference to FIG. 4, the non-planar portions of the side flanges 106 and 108 define the trailing end 111 of the container 100. The trailing end 111 can be curved in part or in its entirety. The trailing end 111 of the container 100 terminates in the trailing seal flange 104, which extends slightly below the raised portion 115 of the bottom surface 112 of the container 100.

FIGS. 5-9 illustrate a second exemplary container 200 having one or more non-planar seal flanges. Similar to the container 100, the container 200 can be used to store a food product 230, as shown in FIG. 6. The container 100 can be made of a flexible material including, but not limited to polyethylene, polypropylene, or the like. The container 200 can be laminated and optionally include a metalized layer. For example, the container 200 can be thermoformed, injection-molded, blow-molded, or the like. A lid 234 may be sealed to the container 200 as shown in FIG. 6 to provide the container 200 with a hermetic seal. The lid 234 can be flexible or rigid.

With reference to FIGS. 5 and 8, the container 200 can have a bottom wall 216, a front wall 217, two opposed side walls 218 and 220, and a hollow interior 219 therebetween. The container 200 also includes a leading seal flange 202, a trailing seal flange 204, and side seal flanges 206 and 208. The leading seal flange 202 can include a tab portion 222 which facilitates the user in peeling off or otherwise removing the lid 234 when opening the container 200.

Similar to container 100 the container 200 does not have a rear wall opposite the front wall 217. Instead, the container 200 has an open area between the seal flanges 202, 204, 206, and 208. This open area can be used to load and/or unload the food product 230 into and out of the container 200. Optionally, a rear wall opposite the front wall 217 can be provided. The hollow interior 219 of the container 200 can store the food product 230 in one stack as shown in FIG. 6, or can store a loose food product that can be dump-filled, for example, candy, chips, nuts, or raisins.

With reference to FIG. 8, the container 200 has a leading end 210 (in the machine downstream direction), a trailing end 211 opposite the leading end 210, a bottom surface 212, and a top surface 214 opposite the bottom surface 212. The leading seal flange 202 can protrude beyond and overhang the leading end 210 of the container 200. The trailing end 211 of the container 200 terminates in a trailing flange 204.

With reference to FIG. 8, the bottom surface 212 of the container 200 proximate the trailing end 211 can curve or deviate in a straight line or otherwise upward to form a raised portion 215. The trailing seal flange 204 can extend slightly beyond and overhang the raised portion 215 of the bottom surface 212. The non-planar shape of the bottom surface 212 does not undermine the stability of the container 200 when positioned on a flat surface. Instead, the protruding trailing seal flange 204 and the non-planar shape of the bottom surface 212 can create a point of stability for the container 200 when positioned on a flat surface such as a shelf or table. In addition, the raised portion 215 of the bottom surface 212 can create a stop for the circular food product 230 and can restrict the food product 230 from inadvertently rolling out of the container 200.

The side flanges 206 and 208 of the container 200 can be non-planar in part or in their entirety from the leading seal flange 202 to the trailing seal flange 204. As such, the top surface 214 of the container 200 can be non-planar in part or in its entirety. Similarly, the bottom surface 212 of the container 200 can be non-planar in part or in its entirety from the leading seal flange 202 to the trailing seal flange 204. As such, the container 200 can have a non-planar leading end 210 and a non-planar trailing end 211. The non-planar shapes of the side flanges 206 and 208 and of the bottom and top surfaces 212 and 214 provide the container 200 with a distinctive and aesthetically appealing appearance.

The container 200 can also be positioned a standing orientation, as shown in FIG. 9. The non-planar shape of the side flange 206 and the exterior surface of the side wall 213 can create one or more points of stability for the container 200 on a flat surface. The lid 234 may include branding information that is oriented vertically (i.e., going from left to right in the direction from the trailing seal flange 204 to the leading seal flange 202) so that the container 200 can foe offered for sale on store shelves in the distinctive standing orientation.

With reference to FIGS. 10-16, a conveyor system 300 and method of applying and sealing a lid to the container 100 will now be described. It will be appreciated that this and any of the systems and methods described below can be advantageously used to seal the aforementioned container 200, or any other container having one or more non-planar seal flanges.

FIG. 10 illustrates a conveyor system 300 advancing a plurality of food storage containers 100 in the machine direction indicated by an arrow. The conveyor system 300 includes a tacking station 330 and a sealing station 370. Generally, as a container 100 passes through the tacking station 330, a lid or cover is placed onto the container 100, and when the container 100 passes through the sealing station 370, the lid is sealed to the seal flanges 102, 104, 106, and 108 of the container 100 to provide a cover and hermetic seal for a food product stored in the container 100.

Figure 11:
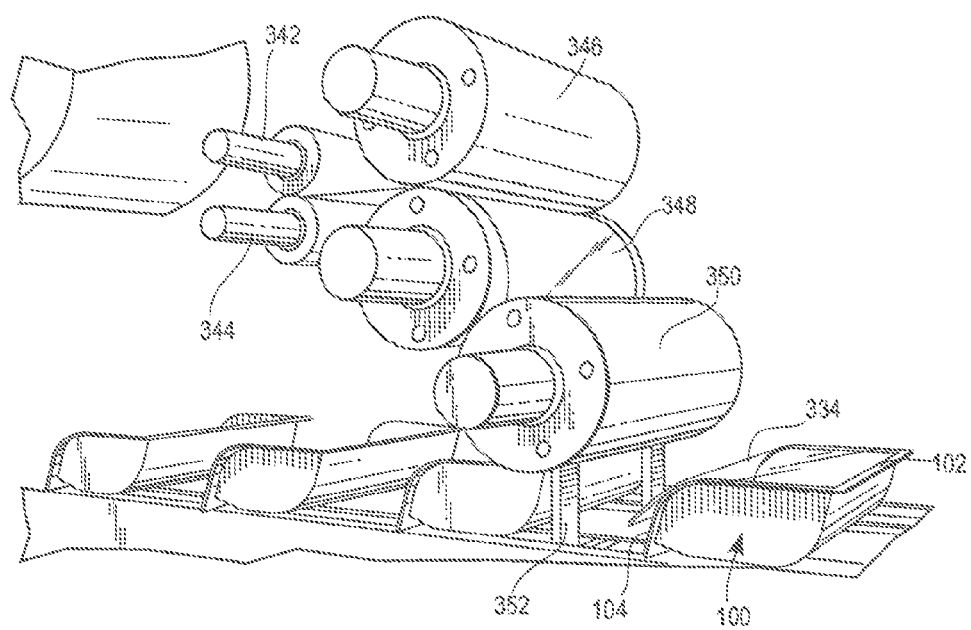
FIG. 11 is a perspective enlarged fragmentary view of the conveyor system of FIG. 10, showing the tacking station for tacking a lid to the leading seal flange of the containers.
Figure 12:
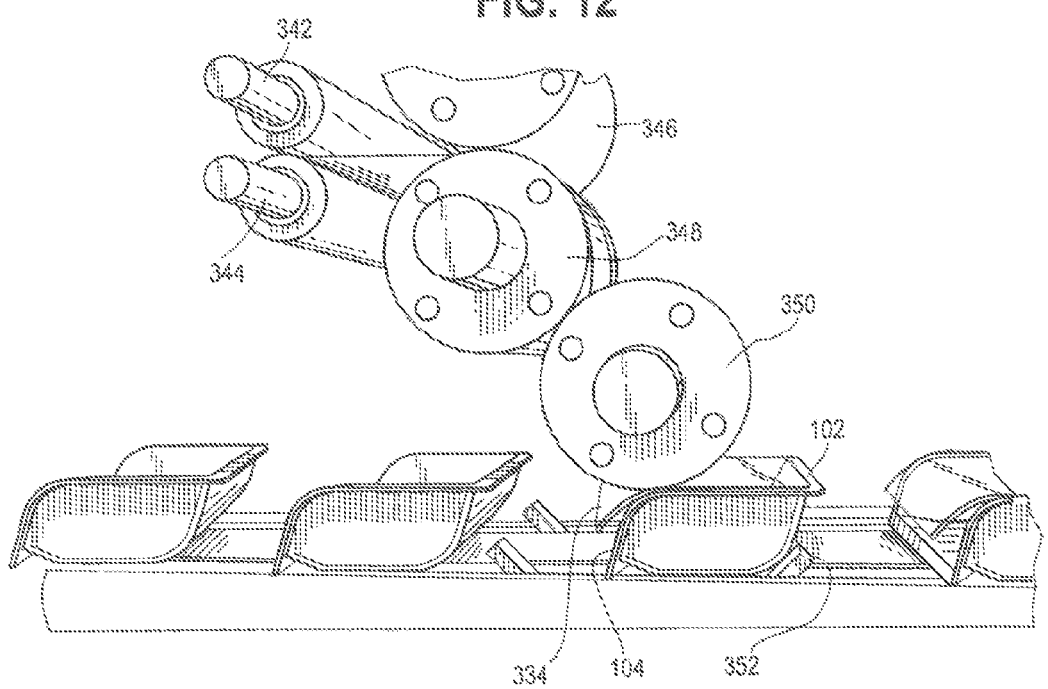
FIG. 12 is a side elevational view of the tacking station of FIG. 11.

With reference to FIGS. 10-12, the tacking station 330 includes a supply roller 332 which includes the lid material 334. The lid material 334 can be made from a thin, flexible material, such as a polymer film or laminate, foil, or the like. Alternatively, the lid material 334 can be made from a more rigid material. The lid material 334 can be unwound from the supply roller 332 in the machine direction as a continuous web 335 and is fed via a series of intermediate rollers 338, 340, 342, 344, and 346 in between a die roller 348 and a vacuum roller 350. The die roller 348 may include a cutting surface which may be indexed relative to the rotation speed of the die roller 348 such that a piece of lid material 334 of appropriate length to cover the seal flanges 102, 104, 106, and 108 of the container 100 may be cut off from the continuous web 335 by the combined action of the action of the die roller 348 and the vacuum roller 350.

The vacuum roller 350 has an axis of rotation that can be parallel to the axis of rotation of the supply roller 332. The axis of rotation of the vacuum roller 350 can also be parallel to the conveyor surface 312 on which the containers 100 travel. The vacuum roller 350 can rotate in a direction opposite to the machine direction. In support member having a plurality of elongate arms 352 rotates beneath the conveyor surface 312 in the machine direction. As the support member rotates, the support arms 352 extend above the conveyor surface 312 as shown in FIGS. 11 and 12.

As a container 100 moves in the machine direction along the conveyor surface 312, the vacuum roller 350 applies the lid material 334 onto the leading seal flange 102 of the container 100. As the lid material 334 is being applied by the vacuum roller 350 to the leading seal flange 102 of the container 100, the support arm 352 rotates into a position where the support arm 352 is substantially perpendicular to the leading seal flange 102, as shown in FIG. 11. In this position, the support arm 352 may be in contact with the underside of the leading seal flange 102, or may be slightly below the underside of the leading seal flange 102. The leading flange 102 gets tacked or nipped between the bottom surface of the vacuum roller 350 and the upper surface of the support arm 352 as shown in FIG. 11. Since the container 100 and the leading flange 102 are flexible, the support arm 352 ensures that the leading seal flange 102 does not bend or break when a sealing force is applied to the leading flange 102 by the vacuum roller 350.

After the vacuum roller 350 applies the lid material 334 to the leading seal flange 102 of the container 100, the container 100 moves further in the machine direction along the conveyor surface 312 such that side seal flanges 105 and 108 of the container 100 pass under the vacuum roller 350. Since portions of the side flanges 106 and 108 are in the same plane as the leading flange 102, the roller 350 can align the lid material 334 to the side flanges 106 and 108 as shown in FIG. 12.

During the application of the lid material 334 to the side seal flanges 106 and 108, the container 100 moves forward and the support arm 352 rotates forward such that the support arm 352 can be maintained in contact with the leading end 110 of the container 100. The support arm 352 can thus act as a back stop for the container 100 as the lid material 334 is being applied to the side flanges 106 and 108 by the vacuum roller 350 to restrict the container 100 from being inadvertently moved out of position due to the force being applied by the vacuum roller 350. Since the trailing flange 104 of the container 100 is non-planar and extends below the plane where the leading seal flange 102 lies, the bottom surface of the vacuum roller 350 does not contact the trailing seal flange 104 and the lid material 334 remains unattached to the trailing seal flange 104 when the container 100 exits from the tacking station 330, as shown in FIG. 12.

Either or both the underside of the lid material 334 and the upper surface of the leading flange may have an adhesive layer. As such, when the container 100 exits the tacking station 330, the lid material 334 can be partially attached by an adhesive to the leading seal flange 102 and/or the side seal flanges 106 and 108. Thus, although the lid material 334 is not attached to the trailing seal flange 104 and not fully sealed to any of seal flanges 102, 106, or 108, the lid material 334 does not shift or fail off the container 100 as the container 100 moves along the conveyor surface 312 toward the sealing station 370.

It is to be appreciated that instead of the tacking station 330 shown in FIG. 1, the conveyor system 300 may include a tacking station with a pick and place device. For example, the tacking station would include a stack of pre-cut sheets of flexible lid material 334 or sheets or stacks of rigid lid material 334 sized and shaped to match the size and shape of the seal flanges 102, 104, 106, and 108 of the container 100. The tacking station would further include a pick and place device which could pick a sheet of lid material 334 off the stack and transfer the sheet of lid material 334 onto a container 100 moving along the conveyor surface 312. For example, the pick and place device could be vacuum-based and could have one or more points of contact with the lid material 334. The pick and place device could apply a pressure to the top of the leading seal flange 102 similar to the vacuum roller 350 such that the sheet of lid material 334 placed onto the container 100 by the pick and place device would be tacked to at least the leading seal flange 102 to ensure that the lid material 334 does not inadvertently fall off the container 100 as the container 100 moves along the conveyor surface from the tacking station to the sealing station 370.

It is to be appreciated that a tacking station such as the tacking station 330 can foe eliminated altogether and flexible or rigid lid material 334 can be transferred from a supply roll or supply stack directly onto the containers and sealed to the seal flanges of the containers 100 in one step at the sealing station 370. In this approach, the containers 100 having partially attached lid material 334 would not travel along the conveyor surface 312 between the tacking station 330 and the sealing station 370. Instead, open containers 100 having no lid material 334 applied to them would travel along the conveyor surface 312 until they reach the sealing station 370, where the lid material 334 would foe applied to the containers 100 for the first time and the containers 100 would be sealed.

With reference to FIG. 10, at the sealing station 370, the conveyor surface 312 has a gap and a portion of a bottom rotary die 360 rotates in the gap and protrudes above the conveyor surface 312. Two top rotating dies or sealing members 366 and 368 rotate over the bottom rotary die 360. The bottom rotary die 360 can have a fixed axis of rotation and rotates in the machine direction. The bottom rotary die 360 includes a plurality of die seats 362. Each die seat 362 includes a cavity sized and shaped to receive the containers 100. Each die seat 362 also includes a plurality of support surfaces 363, 365, 367, and 369 configured to oaten the shape and orientation of the leading, trailing, and side seal flanges 102, 104, 106, and 108 of the container 100.

Figure 15:
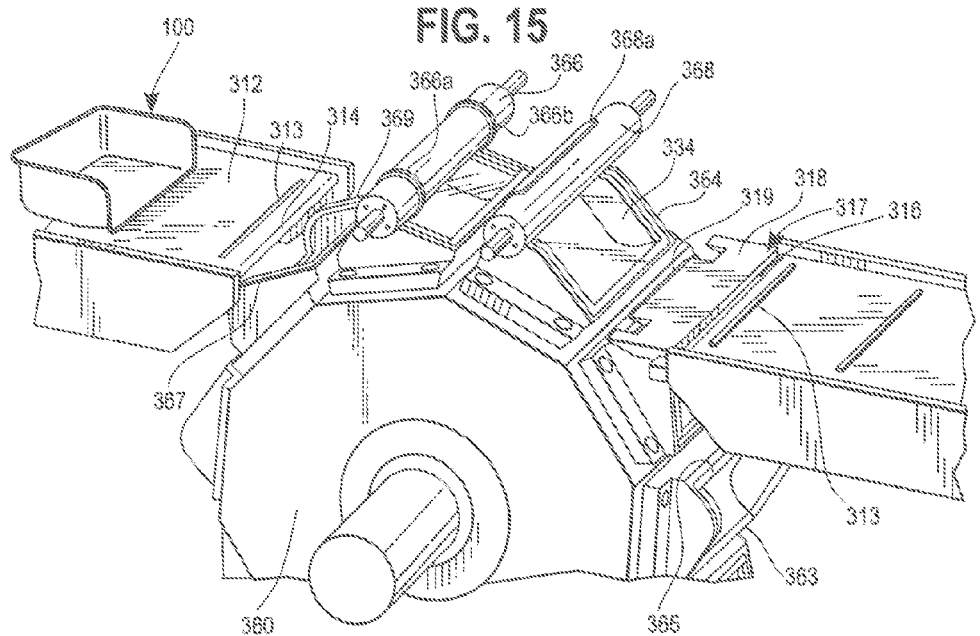
FIG. 15 a front perspective enlarged fragmentary view of the conveyor system of FIG. 10, showing the sealing station for sealing a lid to the seal flanges of the containers.

As the containers 100 move in the machine direction down the conveyor surface 312, a portion of the container 100 passes a trailing edge 314 of a section of the conveyor surface 312 and the container 100 is deposited into the cavity of a die seat 362 of the bottom rotary die 360 as shown in FIG. 15. The container 100 may either be deposited into the die seat 362 of the bottom die 360 solely due to the forward motion of the conveyor surface 312, or may be assisted by a push from behind by one of the raised ribs 313, which can be positioned along the conveyor surface 312 at equal or son-equal intervals.

Figure 16:
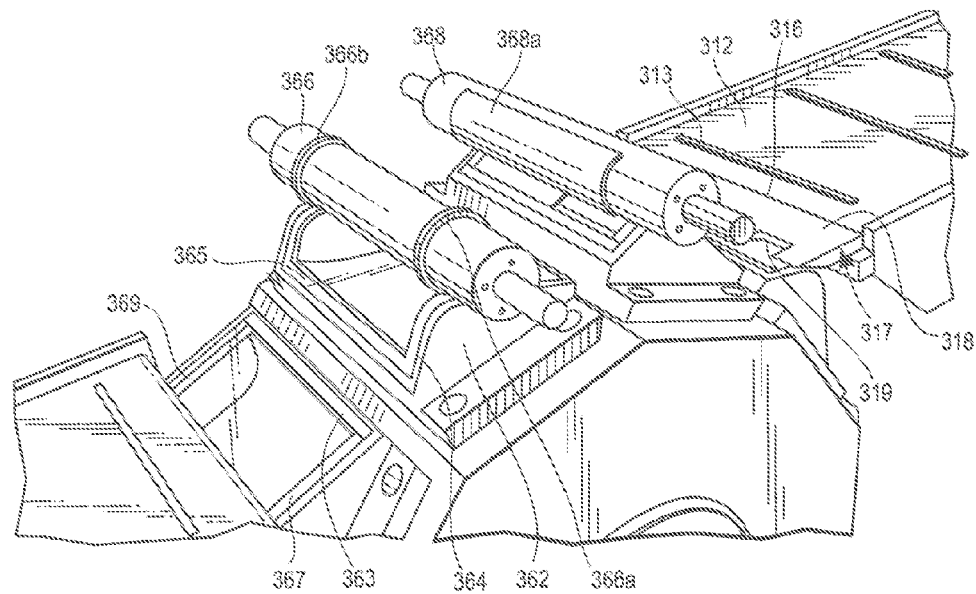
FIG. 16 a rear perspective enlarged fragmentary view of the conveyor system of FIG. 10, showing the sealing station for sealing a lid to the seal flanges of the containers.

The container 100 is positioned in the die seat 362 such that only the seal flanges 102, 104, 106, and 108 protrude from the cavity formed in the die seat 362. In particular, the seal flanges 102, 104, 106 and 108 of the container 100 rest on the support surfaces 363, 365, 367, and 369, respectively, of the die seat 362. As shown in FIGS. 15 and 16, a rubber or plastic insert 364 may surround the support surfaces 363, 365, 367, and 369 of each seat 362 to compensate for variations in material and machine orientations.

The top rotating sealing members 366 and 368 can be cylindrical and can each have an axis of rotation parallel to the axis of rotation of the bottom rotary die 360. The first top die 366 has a surface configuration such that the width of the die surfaces 366a and 366b protruding from the top die 366 generally match the widths of the side seal flanges 106 and 108, respectively, of the container 100. The second top die 368 has a surface configuration such that the width of the die surface 368a protruding from the die 368 generally matches the widths of the leading and trailing seal flanges 102 and 104 of the container 100. Optionally, instead of the cylindrical sealing member 366 having sealing surfaces 366a and 366b that seal the lid material 334 to the side seal flanges 106 and 108 and the cylindrical sealing member 368 having a sealing surface 368a that seals the lid material 334 to the leading and trailing flanges 102 and 104, the conveyor system 300 can include a single top die or sealing member having one or more sealing surfaces configured to seal each of the leading, trailing, and side flanges 102, 104, 106, and 108 of the container 100.

As such, when a container 100 received in a seat 362 of the bottom rotary die 360 passes under first top die 366, the top die 366 seals the lid material 334 to the side flanges 106 and 108 of the container 100. In particular, as the container 100 moves in the seat 362 of the bottom rotary die 360 under the top die 366, the top die 366 rolls over the side flanges 106 and 108 such that the lid material 334 and the first and second side seal flanges 106 and 108 of the container 100 are nipped between the die surfaces 366a and 366b of the top die 366 and the support surfaces 367 and 369 of the seat 362 of the bottom die 360. Since the top die 366 applies sealing pressure against the flexible side seal flanges 106 and 108 of the container 100, the support surfaces 367 and 369 of the seat 362 provide support to and prevent the bending and/or breaking of the side seal flanges 106 and 108, respectively, similarly to the support arm 352 at the tacking station 330.

After the seat 362 of the bottom die 360 passes under the top die 366 and the lid material 334 is sealed to the side flanges 106 and 108 of the container 100, the seat 362 travels under the second top die 368. The second top die 368 seals the lid material 334 to the leading and trailing seal flanges 102 and 104 of the container 100. In particular, as the container 300 passes under the top die 368, first the lid material 334 and the leading seal flange 102 are nipped between the die surface 368a of the top die 368 and the support surface 363 of the seat 362 of the bottom die 360.

Then, the lid material 334 and the trailing flange 104 of the container 100 are nipped between the die surface 368a and the support surface 365 of the seat 362 of the bottom die 360. Since the top die 368 applies sealing pressure against the side flanges 106 and 108 of the container 100, the support surfaces 363 and 365 of the seat 362 provide support to and prevent the bending and/or breaking of the leading and trailing seal flanges 102 and 104 of the container 100, respectively, similarly to the support arm 352 at the tacking station 330.

Since the support surfaces 367 and 369 of the seat 362 as well as the side flanges 106 and 108 are non-planar, the first and second top sealing members 366 and 368 and their respective sealing surfaces 366a, 366b, and 368a do not move only about the initial axes of rotation of the top sealing members 366 and 368. In particular, as the die surfaces 366a, 366b, and 368a of the top sealing members 366 and 368 travel along the respective sealing flanges 102, 104, 106, and 108, the top sealing members 365 and 368 can travel both in an upward direction relative to their initial axes of rotation and in a downward direction relative to their initial axes of rotation. As such, each sealing member 366 and 368 has a variable axis of rotation which can reciprocate, and the relative position of the container 100 and the top sealing members 366 and 368 can vary as the lid material 334 is being sealed to the container 100.

The rotational speed of the bottom rotary die 360 and the top sealing members 366 and 368 may be constant during the sealing of the lid material 334 to the container 100. Alternatively, the rotational speed of either one or both the top sealing members 366 and 368 may vary during the sealing of the lid material 334 to the container 100.

The top sealing members 366 and 368 can apply a sealing pressure in a direction that is normal to the seal flanges 102, 104, 106, and 108 of the container 100. More specifically, the bottom surfaces of the top sealing members 366 and 368 can apply a sealing force that is perpendicular to a line tangential to the non-planar seal flanges 102, 104, 106, and 108 of the container 100. This can provide for a smoothing action that can eliminate undesired wrinkling of the lid material 334 as it is being applied to the container 100. Any wrinkles upstream of the sealing point of contact can be eliminated by the top sealing members 366 and 368 as a seal is made at the next sealing point, especially since the sealing surfaces 366a, 366b, and 368b of the top sealing members 366 and 368 travel continuously along the surfaces of the seal flanges 102, 104, 106, and 108 from the leading end 110 to the trailing end 111 of the container 100.

With reference to FIG. 15, after the second top die 368 seals the lid material 334 to the trailing flange 104 of the container 100, the container 100 is transferred back to the conveyor surface 312. In particular, the leading end 316 of the conveyor surface 312 can have a loading platform 317 extending in a direction toward the bottom rotary die 360. The loading platform 317 may have an upper surface 318 that is in the same horizontal plane as the conveyor surface 312. Alternatively, the upper surface 318 of the loading platform 317 may be above or below the conveyor surface 312, or may be angled relative to the conveyor surface 312. The loading platform 317 can have a leading edge 319.

As the seat 362 with a fully sealed container 100 is rotated by the bottom die 360 toward the loading platform 317, the leading edge 319 of the loading platform 317 can lift the leading seal flange 102 from the support surface 363 of the seat 362 of the bottom die 360. With the leading flange 102 being lifted, the forward motion of the bottom die 360, can urge the trailing flange 104 and the side flanges 106 and 108 of the container 100 to be lifted off the remaining support surfaces 365, 367, and 369, respectively, such that the container 100 can be ejected from the seat 360 and transferred onto the loading platform 317. The loading platform 317 can be shorter than the container 100 and as such, when the sealed container 100 is transferred onto the loading platform 317, a portion of the container 100 comes in contact with and is pushed onto the leading edge 316 of the downstream section of the conveyor surface 312.

The conveyor surface 312 can be made from a material that has sufficient friction with the container 100 such that when a portion of the container 100 sits on or is in contact with the conveyor surface 312, the container 100 can be pulled onto the conveyor surface 312. If the flat portion of the conveyor surface 312 does not pull the container 100 off the loading platform 317, one of the raised ribs 313 may facilitate the transfer of the container 100 from the loading platform 317 onto the conveyor surface 312. Once back on the conveyor surface 312, the containers 100 can travel along the conveyor surface 312 coward a packing or accumulating station such as known in the art.

With reference to FIGS. 17-22, a second embodiment of a conveyor system 400 and method for applying a lid to the container 100 will now be described. Similarly to the first conveyor system 300, the second conveyor system 400 can be used to seal the container 200 or any other container having one or more non-planar seal flanges.

The conveyor system 400 includes a tacking station 430 and a sealing station 470. As the containers 100 pass through the tacking station 430, lid material 434 is placed onto the containers 100, and as the containers 100 pass through the sealing station 470, the lid material 434 is sealed to the containers 100 to provide a cover and hermetic seal for the food product stored in the containers 100.

The tacking station 430 is identical to the tacking station 430 described with reference to conveyor system 300 and will not be separately described here, but like reference numerals will be used to designate like parts. Instead of the tacking station 430 shown in FIG. 17, the conveyor system 400 may include a tacking station with a pick and place device as described above in reference to the tacking station 330.

As the containers 100 exit the tacking station 430 with the lid material. 434 tacked to the leading seal flange 102, they travel in the machine direction toward the sealing station 470. At the sealing station 470, the section of the conveyor surface 412 has a gap and a bottom rotary die 460 rotates in the gap and protrudes above the conveyor surface 412. The bottom rotary die 460 is identical to the bottom rotary die 360 described above in reference to the conveyor system 300, and will not be described separately, but like numbers will be used to designate like parts.

Instead of two top rotating sealing members 366 and 368, the conveyor system 400 includes a rotary top die or sealing member 466 positioned over the bottom rotary die 460. The top sealing member 466 can have a plurality of dies or surface configurations 472 with matching profile geometry to the seats 462 of the bottom rotary die 460, as shown in FIGS. 19-22. The dies or surface configurations 472 of the top sealing member 466 can be continuously curved or non-planar to provide an involute shape. In particular, each die 472 has sealing surfaces 473, 475, 477, and 479 sized and shaped to match the support surfaces 463, 465, 467, and 469, respectively, of the seats 462 of the bottom die 460. While the bottom die 460 rotates in the machine direction, the top sealing member 466 rotates in a direction opposite to the bottom die 460 and opposite to the machine direction.

When a container 100 received in a seat 462 of the bottom rotary die 460 passes under the top sealing member 466, the sealing surfaces 473, 475, 477, and 479 and the support surfaces 463, 465, 467, and 469 of the seat 462 of the bottom rotary die 460 come into contact with the lid material 434 and nip the lid material 434 and the seal flanges 102, 104, 106, and 108, respectively, of the container 100 to hermetically seal the lid material 434 to the container 100. As shown in FIGS. 20 and 21, a rubber or plastic insert 464 may surround the support surfaces 463, 465, 467, and 469 of each seat 462 to compensate for variations in material and machine orientations.

In particular, as the container 100 seated in the seat 462 of the bottom die 460 passes under the top sealing member 466, first the lid material 434 and the leading seal flange 102 of the container 100 are nipped between the sealing surface 473 of the top sealing member 466 and the support surface 463 of the seat 462 of the bottom die 460 as shown in FIG. 20. As the top sealing member 466 and the bottom die 460 continue to rotate, the sealing surfaces 477 and 479 of the top sealing member 466 roll over the side seal flanges 106 and 108 and nip the lid material 434 to the support surfaces 467 and 469 of the seat 462 of the bottom die 460.

Finally, the sealing surface 475 of the top sealing member 466 and the support surface 465 of the seat 462 of the bottom die 460 nip the lid material 434 and the trailing seal flange 104 to seal the lid material 434 to the container 100 such that the container 100 is hermetically sealed as shown in FIGS. 21 and 22. Since the top sealing member 466 applies sealing pressure against the leading, trailing, and side seal flanges 102, 104, 106, and 108 of the container 100, the support surfaces 463, 465, 467, and 469 of the seat 462 of the bottom rotary die 460 provide support to and prevent the bending and/or breaking of the seal flanges 102, 104, 106, and 108 of the container 100, respectively, similarly to the support arm 452 at the tacking station 430.

The top sealing member 466 rotates about one axis of rotation and the bottom die 460 rotates about one axis of rotation which can be parallel to, or different from, the axis of rotation of the top sealing member 466. As such, the sealing member 466 has a constant axis of rotation. Since the support surfaces 467 and 469 of the seat 462 of the bottom die 460 and the side flanges 106 and 108 of the container 100 are non-planar, the sealing surfaces 477 and 479 of the top sealing member 466 have a matching curvature and travel along the respective non-planar sealing flanges 106 and 108 without requiring the top sealing member 466 to travel out of its axis of rotation. It is to be appreciated that the top sealing member 466 and the bottom die 460 can have synchronized speeds of rotation. Further, it will be appreciated that the speed of rotation the sealing member 460 and the bottom die 466 can be synchronized with the speed of the conveyor surface 412.

Thus, unlike the top sealing members 366 and 368, which can reciprocate by traveling in and out of their axes of rotation, the top sealing member 466 can seal all seal flanges 102, 104, 106, and 108 of the container 100 while traveling about only one constant axis of rotation. Similar to the sealing surfaces 366a, 368a, and 638b of the top sealing members 366 and 368, the sealing surfaces 473, 475, 477, and 479 of the top sealing member 466 can provide a sealing force that is perpendicular to a line tangential to the non-planar seal flanges 102, 104, 106, and 108 of the container 100. This can provide for a smoothing action that can eliminate undesired wrinkling of the lid material 434 as it is being applied to the container 100 as discussed in more detail above in reference to the conveyor system 300.

With reference to FIG. 17, after the top sealing member 466 seals the lid material 434 to the trailing flange 104 of the container 100, the hermetically sealed container 100 can be transferred from the seat 462 of the bottom rotary die 460 back to the conveyor surface 412 substantially as described above in reference to the conveyor system 300. For example, the conveyor surface 412 may include a loading platform similar to the platform 317 described above in reference to the conveyor system 300. Alternatively, the bottom die 460 may simply unload the sealed packages 100 onto the conveyor surface 412 due to its forward rotating motion. Once back on the conveyor surface 412, the containers 100 can travel along she conveyor surface 412 toward a packing or accumulating station such as known in the art.

With reference to FIGS. 23-28, a third embodiment of a conveyor system 500 and method for applying a lid to the container 100 will now be described. Similarly to the conveyor systems 300 and 400, the conveyor system 500 can foe used to seal the container 200 or any other container having one or more non-planar seal flanges.

The conveyor system 500 includes a tacking station 530 and a sealing station 570. As the containers 100 pass through the tacking station 530, lid material 534 is placed onto the containers 100, and as she containers 100 pass through the sealing station 570, the lid material 534 is sealed so the containers 100 to provide a cover and hermetic seal for the food product stored in the containers 100.

The tacking station 530 is identical to the tacking station 330 described with reference to conveyor system 300 and will not be separately described here, but like reference numerals will foe used to designate like parts. Instead of the tacking station 530 shown in FIG. 23, the conveyor system 500 may include a tacking station with a pick and place device as described above in reference to the tacking station 330.

Figure 23:
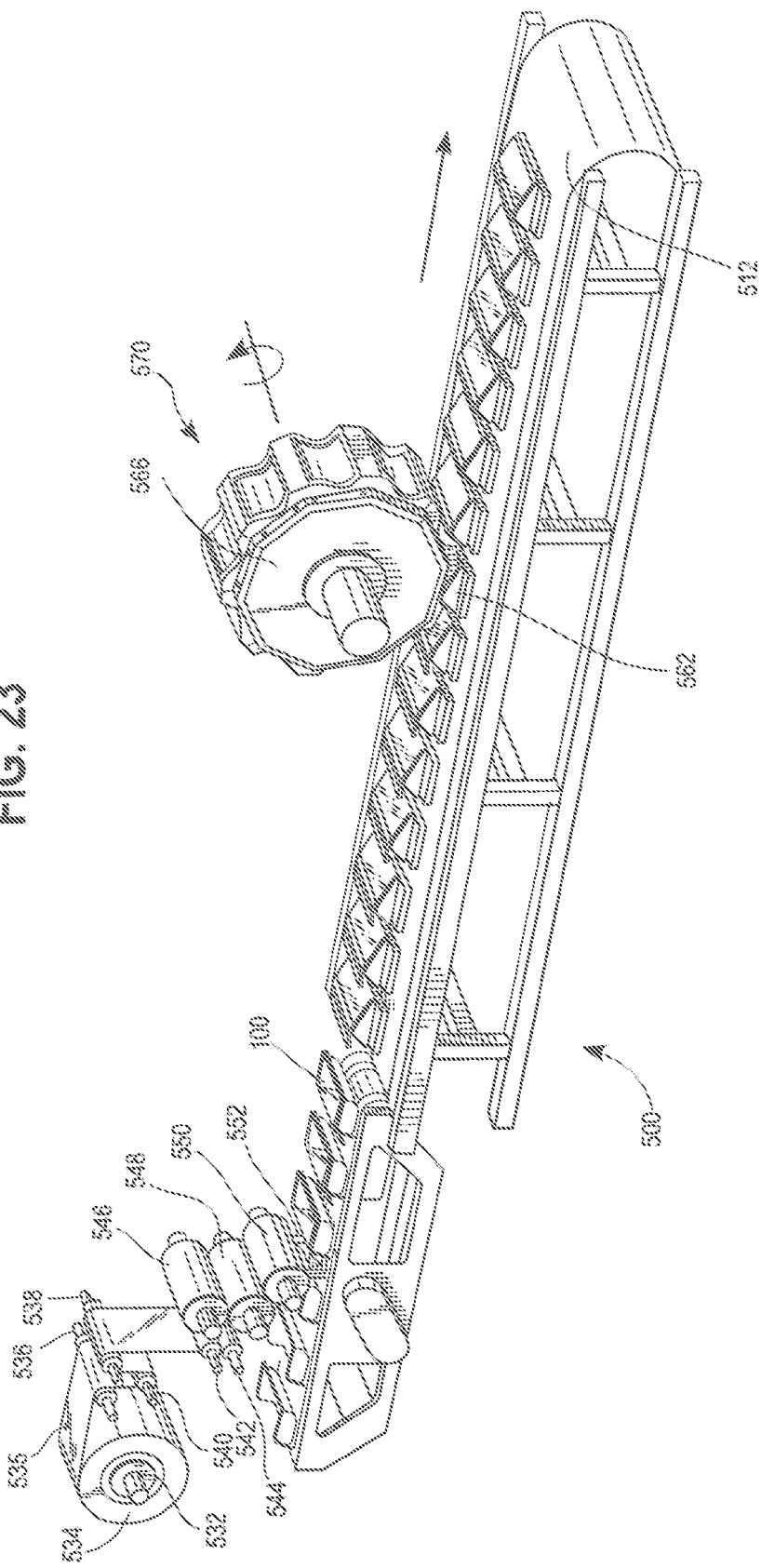
FIG. 23 is a perspective view of a third exemplary conveyor system for sealing the container of FIG. 1.
Figure 24:
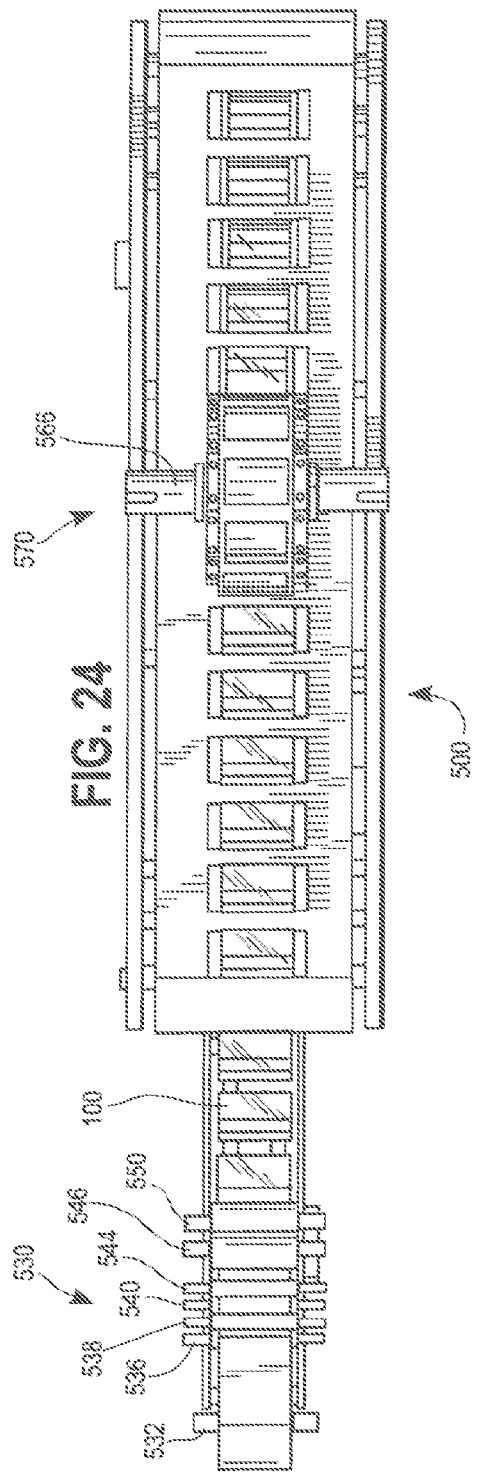
FIG. 24 is a top plan view of the conveyor system of FIG. 23.

The conveyor surface 512 includes a plurality of die seats 562 similar or identical in shape to the die seats 362 and 462 described in reference to conveyor systems 300 and 400 above. The die seats 562 form a so-called die train along the conveyor surface 512. As the containers 100 exit the tacking station 530 with the lid material 534 tacked to their leading seal flanges 102, the containers 100 travel along the conveyor surface 512 in the machine direction and are deposited into a respective die seat 562 on the conveyor surface 512 as shown in FIG. 23.

Figure 25:
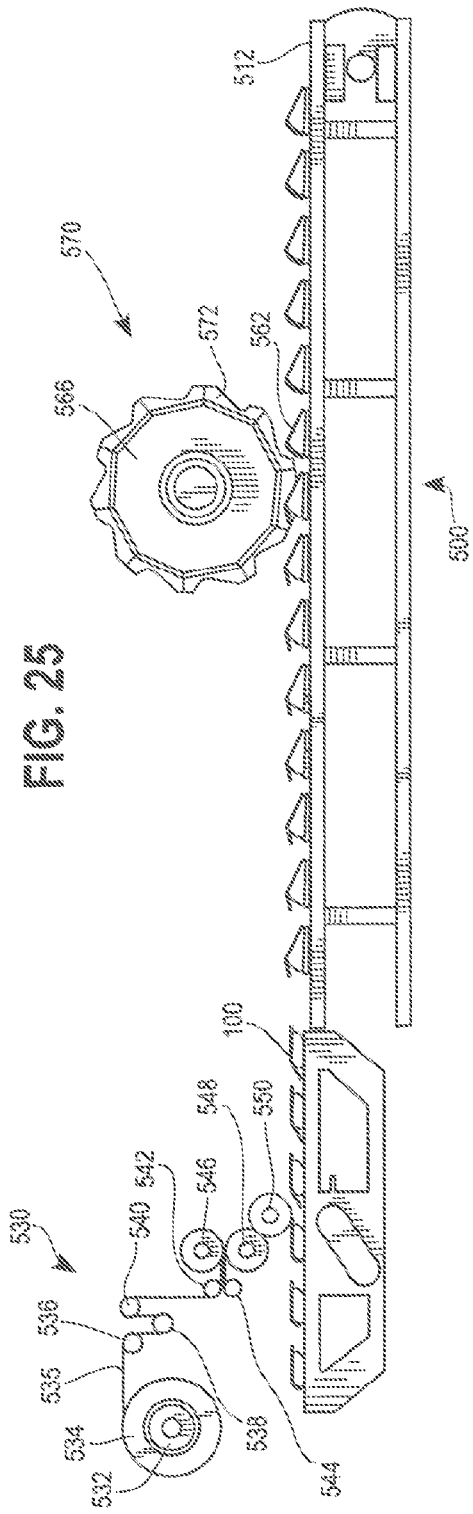
FIG. 25 is a side elevational view of the conveyor system of FIG. 23.

The container 100 is positioned in the die seats 562 such that only the seal flanges 102, 104, 106, and 108 of the container 100 protrude from the cavity formed in the die seat 562. In particular, the seal flanges 102, 104, 106 and 108 of the container 100 rest on the support surfaces 563, 565, 567, and 569, respectively, of the die seat 562. As shown in FIGS. 25 and 26, a rubber or plastic insert 564 may surround the support surfaces 563, 565, 567, and 569 of each die seat 562 to prevent to compensate for variations in material and machine orientations.

The conveyor system 500 includes a rotary top die or sealing member 566 positioned at the sealing station 570 over the conveyor surface 512. The top sealing member 566 can be identical to the top rotary die or sealing member 466 described above in reference to the conveyor system 400 and where appropriate, like reference numerals will be used to describe like parts.

The rotary top sealing member 556 has a matching profile geometry to the seats 562 formed on the conveyor surface 512, as shown in FIGS. 26-28. In particular, the top sealing member 566 has a plurality of dies or surface configurations 572 with die sealing surfaces 573, 575, 577, and 579 sized and shaped to match the support surfaces 563, 565, 567, and 569, respectively, of the die seats 562. The dies or surface configurations 572 of the top sealing member 566 can be continuously curved or non-planar to provide an involute shape. The top sealing member 566 rotates in a direction opposite to the machine direction as shown in FIG. 23. When a container 100 received in a die seat 562 passes under the top sealing member 566, the sealing surfaces 573, 575, 577, and 579 and the support surfaces 563, 565, 567, and 569 of the seat 562 nip the lid material 534 and the flanges 102, 104, 106, and 108, respectively, of the container 100 to hermetically seal the lid material 534 to the container 100.

In particular, as the container 100 seated in the seat 562 passes under the top sealing member 566, first the lid material 534 and the leading flange 102 of the container 100 are nipped between the sealing surface 573 of the top sealing member 566 and the support surface 563 of the seat 562 as shown in FIG. 26. As the seat 562 moves in the machine direction and the top sealing member 566 rotates, the sealing surfaces 577 and 579 of the top sealing member 566 roll over the side seal flanges 106 and 108 and nip the lid material 534 to the support surfaces 567 and 569 of the seat 562, respectively.

Finally, the sealing surface 575 of the top sealing member 566 and the support surface 565 of the seat 562 nip the lid material 534 and the trailing seal flange 104 to seal the lid material 534 to the container 100 such that the container 100 is hermetically sealed as shown in FIGS. 27 and 28. Since the top sealing member 566 applies sealing pressure against the leading, trailing, and side seal flanges 102, 104, 106, and 108 of the container 100, the support surfaces 563, 565, 567, and 569 of the seat 562 provide support to and prevent the bending and/or breaking of the seal flanges 102, 104, 106, and 108 of the container 100, respectively, similarly to the support arm 552 at the tacking station 530.

The top sealing member 566 rotates about one axis of rotation which can be parallel to conveyor surface 512. Since the support surfaces 557 and 569 of the seats 562 and the side flanges 106 and 108 of the container 100 are non-planar, the sealing surfaces 577 and 579 of the top sealing member 566 have a matching non-planar shape and can travel along the respective non-planar sealing flanges 106 and 108 without requiring the top sealing member 566 to travel out of its axis of rotation. It is to be appreciated that the top sealing member 566 can have a synchronized speed of rotation relative to the speed of the conveyor surface 512.

Thus, unlike the top sealing members 366 and 368, which travel radially in and out of their initial axes of rotation, the top sealing member 566 can seal all seal flanges 102, 104, 106, and 108 of the container 100 while traveling about only one axis of rotation. Similar to the sealing surfaces 366a, 368a, and 638b of the top sealing members 366 and 368, the sealing surfaces 573, 575, 577, and 579 of the top sealing member 566 can provide a sealing force that is perpendicular to a line tangential to the non-planar seal flanges 102, 104, 106, and 108 of the container 100. This can provide for a smoothing action that can eliminate undesired wrinkling of the lid material 534 as it is being applied to the container 100 as discussed in more detail above in reference to the conveyor system 300.

With reference to FIG. 17, after the top sealing member 566 seals the lid material 534 to the trailing seal flange 104 of the container 100, the hermetically sealed container 100 continues to move in the die seat 562 along the conveyor surface 512 until it reaches an accumulating or packing station.

Optionally, any of the methods described in conjunction with the conveyor systems 300, 400, and 500 can include the step of creating a pressure atmosphere in the package that urges the lid in a direction away from the food product stored in the package. Likewise, any of the methods described in conjunction with the conveyor systems 300, 400, and 500 can include the step of creating a protective atmosphere in the food package to increase a shell life of the food product stored in the package. Further it is to be appreciated that the sealing surfaces of the sealing members 366, 368, 466, and 566 described in conjunction with the conveyor systems 300, 400, and 500, respectively, can be made from metal or from a resilient material.

These teachings describe containers having non-planar seal flanges. The containers can be sealed using any one of the above-discussed methods geared toward sealing containers having non-planar seal flanges.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the concept.

The invention claimed is:

1. A method of sealing a package containing a food product, the method comprising:
advancing the package in a linear direction on a conveyor surface toward a sealing member;
applying a lid to a non-planar flange surrounding a periphery of the package;
supporting at least a portion of the non-planar flange; and
progressively sealing the lid to the supported portion of the non-planar flange by applying pressure at one or more tangent points against the lid and the flange using a sealing member having a pressure applying surface that rotates about an axis of rotation and radially varies relative to the axis of rotation, the axis of rotation of the sealing member being perpendicular to the direction of linear advancement of the package on the conveyor surface toward the sealing member.

2. The method of claim 1, wherein the step of supporting at least a portion of the non-planar flange further includes supporting the flange along its entire surface during the step of progressively sealing the lid.

3. The method of claim 1, wherein the step of supporting at least a portion of the non-planar flange further includes supporting the flange using a flange support surface that rotates about an axis of rotation, the axis of rotation of the flange support surface being parallel to the axis of rotation of the pressure applying surface.

4. The method of claim 1, wherein the non-planar flange advances in a linear direction perpendicular to the axis of rotation of the pressure applying surface.

5. The method of claim 1, wherein the step of applying a lid further comprises a step of tacking a portion of the lid to a leading end of the non-planar flange.

6. The method of claim 1, wherein the step of progressively sealing the lid includes sealing a portion of the lid to a leading end of the flange in a first plane and sealing another portion of the lid to a trailing end of the flange in a second plane.

7. The method of claim 1, further comprising a step of transporting the package along the conveyor surface with a portion of the lid attached to the non-planar flange and a portion of the lid unattached to the non-planar flange.

8. The method of claim 1, wherein the step of progressively sealing includes a step of providing at least one cylindrical top sealing member having at least one sealing surface configured to rotate and contact the non-planar flange to seal the lid to the package.

9. The method of claim 8, wherein the step of providing at least one cylindrical top sealing member includes providing two cylindrical top sealing members where one of the sealing members seals one portion of the lid to one portion of the non-planar flange and the other of the sealing members seals another portion of the lid to another portion of the non-planar flange.

10. The method of claim 9, wherein the step of providing two cylindrical top sealing members includes a step of rotating the two cylindrical top sealing members at different speeds.

11. The method of claim 1, wherein the step of progressively sealing includes a step of providing a bottom rotary die having a plurality of seats, each seat having a plurality of support surfaces configured to support the non-planar flange thereon, and a step of providing a top rotary sealing member having a plurality of sealing surfaces configured to contact the support surfaces of the seats to seal the lid to the package.

12. The method of claim 1, wherein the step of progressively sealing includes a step of providing the conveyor surface with a plurality of seats, each seat having a plurality of support surfaces configured to support the non-planar flange thereon, and a step of providing a top rotary sealing member having a plurality of sealing surfaces configured to rotate and contact the support surfaces to seal the lid to the package.

13. The method of claim 1, wherein the step of progressively sealing includes a step of using the sealing member having a sealing surface that radially varies relative to the axis of rotation.

14. The method of claim 1, wherein the step of progressively sealing includes a step of using the sealing member having an axis of rotation that reciprocates.

15. The method of claim 1, wherein the axis of rotation of the sealing member reciprocates.

16. An apparatus for sealing a lid to a non-planar flange surrounding a periphery of a package containing a food product, the apparatus comprising:
- a conveyor surface configured to linearly advance the package on the conveyor surface in a direction toward a bottom rotary die;
- a bottom rotary die protruding at least in part above the conveyor surface and having a plurality of seats, each seat having a plurality of support surfaces configured to support at least a portion of the non-planar flange, the bottom rotary die having an axis of rotation perpendicular to the direction of linear advancement of the package on the conveyor surface; and
- at least one top sealing member having at least one sealing surface configured to rotate and contact the non-planar flange to seal the lid to the flange.

17. The apparatus of claim 16, wherein the at least one top sealing member rotates about a reciprocating axis of rotation to seal the lid to the flange.

18. The apparatus of claim 16, wherein the at least one top sealing member comprises two top sealing members each configured to rotate about a reciprocating axis of rotation to seal the lid to the flange.

19. The apparatus of claim 16, wherein the at least one top sealing member includes a first top sealing member configured to seal one portion of the lid to one portion of the flange and a second top sealing member configured to seal another portion of the lid to another portion of the flange.

20. An apparatus for sealing a lid to a non-planar flange surrounding a periphery of a package containing a food product, the apparatus comprising:
- a conveyor configured to linearly advance the package on the conveyor in a direction toward at least one top sealing member, the conveyor including a plurality of seats formed thereon, each seat having a plurality of support surfaces configured to support the non-planar flange; and
- at least one top sealing member having at least one sealing surface configured to rotate and press the lid against the flange, the at least one top sealing member having an axis of rotation perpendicular to the direction of linear advancement of the package on the conveyor.

21. The apparatus of claim 20, wherein the top sealing member comprises a plurality of sealing surfaces, the top sealing member configured to rotate about one axis of rotation and contact the support surfaces of the seats to seal the lid to the package.

22. A method of sealing a package containing a food product, the method comprising:
- applying a lid to a non-planar flange surrounding a periphery of the package;
- supporting at least a portion of the non-planar flange; and
- progressively sealing the lid to the supported portion of the non-planar flange by applying pressure at one or more tangent points against the lid and the flange using a sealing member having a pressure applying surface that rotates about an axis of rotation and one of radially varies relative to the axis of rotation and the axis of rotation reciprocates;
- wherein the step of progressively sealing includes a step of providing at least one cylindrical top sealing member having at least one sealing surface configured to rotate and contact the non-planar flange to seal the lid to the package; and
- wherein the step of providing at least one cylindrical top sealing member includes providing two cylindrical top sealing members where one of the sealing members seals one portion of the lid to one portion of the non-planar flange and the other of the sealing members seals another portion of the lid to another portion of the non-planar flange.

* * * * *